(12) United States Patent
Jones

(10) Patent No.: US 12,418,771 B2
(45) Date of Patent: *Sep. 16, 2025

(54) SYSTEMS, METHODS AND APPARATUS FOR GEOFENCE NETWORKS

(71) Applicant: GeoFrenzy, Inc., Tiburon, CA (US)

(72) Inventor: Benjamin T. Jones, Las Vegas, NV (US)

(73) Assignee: GeoFrenzy, Inc., Tiburon, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/668,939

(22) Filed: May 20, 2024

(65) Prior Publication Data

US 2024/0314517 A1  Sep. 19, 2024

Related U.S. Application Data

(63) Continuation of application No. 18/071,149, filed on Nov. 29, 2022, now Pat. No. 12,022,352, which is a
(Continued)

(51) Int. Cl.
*G06F 16/29* (2019.01)
*B64C 39/02* (2023.01)
(Continued)

(52) U.S. Cl.
CPC ........... *H04W 4/021* (2013.01); *B64C 39/024* (2013.01); *G06F 16/29* (2019.01); *G06F 16/951* (2019.01);
(Continued)

(58) Field of Classification Search
CPC ................ H04W 4/021; G06F 16/29
(Continued)

(56) References Cited

U.S. PATENT DOCUMENTS 6,192,347 B1  2/2001 Graff
6,836,806 B1  12/2004 Raciborski et al.
(Continued)

FOREIGN PATENT DOCUMENTS

AU  2013355371 B2  7/2015
EP  2672739 A1  12/2013
(Continued)

OTHER PUBLICATIONS

Christian Maihofer, "A Survey of Geocast Routing Protocols," IEEE Communications Surveys Second Quarter 2004, vol. 6, No. 2, pp. 32-42 (2004).
(Continued)

*Primary Examiner* — Sibte H Bukhari
(74) *Attorney, Agent, or Firm* — NEO IP

(57) ABSTRACT

Systems and methods are disclosed for enforcing at least one rule associated with a geofence. At least one device is constructed and configured in network communication with a server platform and a database. The server platform defines at least one geofence for a region of interest and specifies at least one rule associated with the at least one geofence, thereby creating a rule-space model for the region of interest. The at least one geofence comprises a multiplicity of geographic designators with each geographic designator assigned with a unique IPv6 address. The at least one device receives at least one notification signal regarding the at least one rule from the at least one server platform and implements the at least one rule when the at least one device is within a predetermined distance from the at least one geofence for the region of interest.

9 Claims, 11 Drawing Sheets

Related U.S. Application Data continuation of application No. 17/219,129, filed on Mar. 31, 2021, now Pat. No. 11,523,249, which is a continuation of application No. 16/394,820, filed on Apr. 25, 2019, now Pat. No. 10,979,849, which is a continuation-in-part of application No. 15/496,602, filed on Apr. 25, 2017, now Pat. No. 10,375,514, which is a continuation-in-part of application No. 15/213,072, filed on Jul. 18, 2016, now Pat. No. 10,115,277, which is a continuation-in-part of application No. 15/007,661, filed on Jan. 27, 2016, now Pat. No. 9,396,344, which is a continuation of application No. 14/740,557, filed on Jun. 16, 2015, now Pat. No. 9,280,559, which is a continuation of application No. 14/728,259, filed on Jun. 2, 2015, now Pat. No. 9,363,638, said application No. 15/213,072 is a continuation-in-part of application No. 14/953,485, filed on Nov. 30, 2015, now Pat. No. 9,875,251, which is a continuation-in-part of application No. 14/745,951, filed on Jun. 22, 2015, now Pat. No. 9,906,609, which is a continuation-in-part of application No. 14/728,259, filed on Jun. 2, 2015, now Pat. No. 9,363,638, said application No. 15/213,072 is a continuation-in-part of application No. 14/811,234, filed on Jul. 28, 2015, now Pat. No. 10,121,215, which is a continuation-in-part of application No. 14/755,669, filed on Jun. 30, 2015, now Pat. No. 9,906,902, which is a continuation-in-part of application No. 14/745,951, filed on Jun. 22, 2015, now Pat. No. 9,906,609, said application No. 14/811,234 is a continuation-in-part of application No. 14/740,557, filed on Jun. 16, 2015, now Pat. No. 9,280,559, and a continuation-in-part of application No. 14/745,951, filed on Jun. 22, 2015, now Pat. No. 9,906,609, said application No. 14/755,669 is a continuation-in-part of application No. 14/728,259, filed on Jun. 2, 2015, now Pat. No. 9,363,638.

(60) Provisional application No. 62/030,252, filed on Jul. 29, 2014.

(51) Int. Cl.

| | |
|---|---|
| *G06F 16/951* | (2019.01) |
| *G06F 21/60* | (2013.01) |
| *G08G 5/26* | (2025.01) |
| *G08G 5/34* | (2025.01) |
| *G08G 5/55* | (2025.01) |
| *G08G 5/57* | (2025.01) |
| *G08G 5/59* | (2025.01) |
| *H04L 12/28* | (2006.01) |
| *H04L 61/45* | (2022.01) |
| *H04L 61/4511* | (2022.01) |
| *H04L 61/5007* | (2022.05) |
| *H04L 67/02* | (2022.01) |
| *H04L 67/141* | (2022.01) |
| *H04L 67/52* | (2022.01) |
| *H04L 67/563* | (2022.01) |
| *H04W 4/021* | (2018.01) |
| *H04W 4/20* | (2018.01) |
| *H04W 4/80* | (2018.01) |
| *H04W 12/08* | (2021.01) |
| *H04W 68/00* | (2009.01) |
| *G06F 21/64* | (2013.01) |
| *H04L 61/5014* | (2022.01) |
| *H04L 101/659* | (2022.01) |
| *H04L 101/69* | (2022.01) |
| *H04W 80/04* | (2009.01) |

(52) U.S. Cl.
CPC ............ *G06F 21/604* (2013.01); *G08G 5/26* (2025.01); *G08G 5/34* (2025.01); *G08G 5/55* (2025.01); *G08G 5/57* (2025.01); *G08G 5/59* (2025.01); *H04L 12/2816* (2013.01); *H04L 61/4511* (2022.05); *H04L 61/457* (2022.05); *H04L 61/5007* (2022.05); *H04L 67/02* (2013.01); *H04L 67/141* (2013.01); *H04L 67/52* (2022.05); *H04L 67/563* (2022.05); *H04W 4/20* (2013.01); *H04W 4/80* (2018.02); *H04W 12/08* (2013.01); *H04W 68/00* (2013.01); *G06F 21/64* (2013.01); *H04L 61/5014* (2022.05); *H04L 2101/659* (2022.05); *H04L 2101/69* (2022.05); *H04W 80/04* (2013.01)

(58) Field of Classification Search
USPC ......................................... 707/737
See application file for complete search history.

(56) References Cited

U.S. PATENT DOCUMENTS

| | | |
|---|---|---|
| 6,844,990 B2 | 1/2005 | Artonne et al. |
| 6,865,028 B2 | 3/2005 | Moustier et al. |
| 6,885,817 B2 | 4/2005 | Artonne et al. |
| 6,895,180 B2 | 5/2005 | Artonne et al. |
| 6,920,129 B2 | 7/2005 | Preston et al. |
| 7,167,799 B1 | 1/2007 | Dolgov et al. |
| 7,498,985 B1 | 3/2009 | Woo et al. |
| 7,525,933 B1 | 4/2009 | Hall |
| 7,613,467 B2 | 11/2009 | Fleischman |
| 7,848,765 B2 | 12/2010 | Phillips et al. |
| 7,865,277 B1 | 1/2011 | Larson et al. |
| 7,865,416 B1 | 1/2011 | Graff et al. |
| 7,873,349 B1 | 1/2011 | Smith et al. |
| 8,016,426 B2 | 9/2011 | Artonne et al. |
| 8,023,895 B2 | 9/2011 | Smith |
| 8,052,081 B2 | 11/2011 | Olm et al. |
| 8,103,567 B1 | 1/2012 | Graff et al. |
| 8,149,801 B2 | 4/2012 | Hall |
| 8,285,628 B1 | 10/2012 | Graff et al. |
| 8,292,215 B2 | 10/2012 | Olm et al. |
| 8,346,578 B1 | 1/2013 | Hopkins et al. |
| 8,483,652 B2 | 7/2013 | Hall |
| 8,493,207 B2 | 7/2013 | Diem |
| 8,510,190 B1 | 8/2013 | Graff et al. |
| 8,582,724 B2 | 11/2013 | Olshansky et al. |
| 8,588,818 B2 | 11/2013 | Huang et al. |
| 8,634,804 B2 | 1/2014 | McNamara et al. |
| 8,638,720 B2 | 1/2014 | Huang et al. |
| 8,717,166 B2 | 5/2014 | Diem |
| 8,718,598 B2 | 5/2014 | Johnson |
| 8,753,155 B2 | 6/2014 | Olm et al. |
| 8,755,824 B1 | 6/2014 | Wang et al. |
| 8,792,917 B2 | 7/2014 | Huang et al. |
| 8,812,024 B2 | 8/2014 | Obermeyer et al. |
| 8,812,027 B2 | 8/2014 | Obermeyer et al. |
| 8,832,293 B2 | 9/2014 | Wang |
| 8,837,363 B2 | 9/2014 | Jones et al. |
| 8,880,101 B2 | 11/2014 | Fraccaroli |
| 8,897,741 B2 | 11/2014 | Johnson |
| 8,918,075 B2 | 12/2014 | Maier et al. |
| 8,922,333 B1 | 12/2014 | Kirkjan |
| 8,928,470 B2 | 1/2015 | Morgan et al. |
| 8,938,201 B2 | 1/2015 | Boulton |
| 8,971,930 B2 | 3/2015 | Li et al. |
| 8,990,356 B2 | 3/2015 | Mcpherson et al. |
| 8,991,740 B2 | 3/2015 | Olm et al. |
| 9,071,931 B2 | 6/2015 | Diem |
| 9,078,098 B1 | 7/2015 | Cronin |
| 9,116,818 B2 | 8/2015 | Bilange et al. |

(56) References Cited

U.S. PATENT DOCUMENTS

| | | |
|---|---|---|
| 9,170,715 B1 | 10/2015 | Alini et al. |
| 9,223,612 B1 | 12/2015 | Feldman et al. |
| 9,280,559 B1 | 3/2016 | Jones |
| 9,294,393 B1 | 3/2016 | Mullooly et al. |
| 9,356,845 B1 | 5/2016 | Dugan et al. |
| 9,363,636 B2 | 6/2016 | Ganesh et al. |
| 9,363,638 B1 | 6/2016 | Jones |
| 9,491,577 B1 | 11/2016 | Jones |
| 9,547,693 B1 | 1/2017 | Sheasby et al. |
| 9,602,970 B1 | 3/2017 | Mahapatra |
| 9,635,500 B1 | 4/2017 | Becker et al. |
| 9,788,153 B1 | 10/2017 | Newstadt et al. |
| 9,788,155 B1 | 10/2017 | Kerr et al. |
| 9,875,251 B2 | 1/2018 | Jones |
| 9,906,609 B2 | 2/2018 | Jones |
| 9,906,902 B2 | 2/2018 | Jones |
| 9,936,346 B2 | 4/2018 | Koukoumidis et al. |
| 10,068,101 B2 | 9/2018 | Durham |
| 10,111,036 B2 | 10/2018 | Ben-Dayan et al. |
| 10,116,697 B2 | 10/2018 | Beckman et al. |
| 10,187,745 B1 | 1/2019 | Zhao |
| 10,229,434 B2 | 3/2019 | Cheng et al. |
| 10,244,361 B1 | 3/2019 | Cooper et al. |
| 10,433,107 B1 | 10/2019 | Zhao et al. |
| 10,467,617 B1 | 11/2019 | Moshfeghi |
| 10,505,893 B1 | 12/2019 | Griggs et al. |
| 10,657,768 B2 | 5/2020 | Northrup et al. |
| 10,713,686 B2 | 7/2020 | Shiffert et al. |
| 10,740,364 B2 | 8/2020 | Cheung |
| 10,785,323 B2 | 9/2020 | Gauglitz et al. |
| 10,862,983 B2 | 12/2020 | Scarborough et al. |
| 10,892,047 B2 | 1/2021 | Wong |
| 10,932,084 B2 | 2/2021 | Branscomb et al. |
| 10,979,849 B2 | 4/2021 | Jones |
| 11,062,408 B2 | 7/2021 | Branscomb et al. |
| 11,100,457 B2 | 8/2021 | Bolta et al. |
| 11,128,636 B1 | 9/2021 | Jorasch et al. |
| 11,158,200 B2 | 10/2021 | Hall |
| 11,252,543 B1 | 2/2022 | Andrews et al. |
| 11,282,139 B1 | 3/2022 | Winklevoss et al. |
| 11,371,857 B2 | 6/2022 | Canavor et al. |
| 11,444,906 B1 | 9/2022 | Rushing et al. |
| 11,875,914 B2 | 1/2024 | Kinlen |
| 12,033,516 B1 | 7/2024 | Pierce et al. |
| 2001/0015965 A1 | 8/2001 | Preston et al. |
| 2002/0010651 A1 | 1/2002 | Cohn et al. |
| 2002/0035432 A1 | 3/2002 | Kubica et al. |
| 2002/0087389 A1 | 7/2002 | Sklarz et al. |
| 2003/0036949 A1 | 2/2003 | Kaddeche et al. |
| 2003/0193519 A1 | 10/2003 | Hayes et al. |
| 2004/0148294 A1 | 7/2004 | Wilkie et al. |
| 2004/0260467 A1 | 12/2004 | Wehrlen et al. |
| 2005/0021223 A1 | 1/2005 | Heaps et al. |
| 2005/0060584 A1 | 3/2005 | Ginter et al. |
| 2005/0200501 A1 | 9/2005 | Smith |
| 2005/0203768 A1 | 9/2005 | Florance et al. |
| 2005/0222769 A1 | 10/2005 | Simon |
| 2005/0262016 A1 | 11/2005 | Hill et al. |
| 2006/0200305 A1 | 9/2006 | Sheha et al. |
| 2007/0220038 A1 | 9/2007 | Crago |
| 2007/0253371 A1 | 11/2007 | Harper et al. |
| 2007/0293996 A1 | 12/2007 | Mori et al. |
| 2008/0001773 A1 | 1/2008 | Rye et al. |
| 2008/0102856 A1 | 5/2008 | Fortescue et al. |
| 2008/0102859 A1 | 5/2008 | Karr et al. |
| 2008/0183344 A1 | 7/2008 | Doyen et al. |
| 2008/0221743 A1 | 9/2008 | Schwarz et al. |
| 2008/0288470 A1 | 11/2008 | Goutard et al. |
| 2008/0291318 A1 | 11/2008 | Artonne et al. |
| 2008/0304487 A1 | 12/2008 | Kotecha |
| 2009/0009357 A1 | 1/2009 | Heen et al. |
| 2009/0062936 A1* | 3/2009 | Nguyen ............... G06N 3/043 700/50 |
| 2009/0083100 A1 | 3/2009 | Darby, Jr. et al. |
| 2009/0102630 A1 | 4/2009 | Nordlund |
| 2009/0132316 A1 | 5/2009 | Florance et al. |
| 2009/0132543 A1 | 5/2009 | Chatley et al. |
| 2009/0144422 A1 | 6/2009 | Chatley et al. |
| 2009/0164360 A1 | 6/2009 | Yoon |
| 2009/0197620 A1 | 8/2009 | Choi et al. |
| 2009/0243925 A1 | 10/2009 | Kellermeier et al. |
| 2010/0044499 A1 | 2/2010 | Dragan et al. |
| 2010/0069035 A1 | 3/2010 | Johnson |
| 2010/0106972 A1 | 4/2010 | Melen et al. |
| 2010/0198714 A1 | 8/2010 | Orfano |
| 2010/0216509 A1* | 8/2010 | Riemer ............ H04M 1/72463 455/557 |
| 2010/0234071 A1 | 9/2010 | Shabtay et al. |
| 2010/0292871 A1 | 11/2010 | Schultz et al. |
| 2010/0292874 A1 | 11/2010 | Duggan et al. |
| 2010/0313245 A1 | 12/2010 | Brandt et al. |
| 2011/0029398 A1 | 2/2011 | Boudville |
| 2011/0055546 A1 | 3/2011 | Klassen et al. |
| 2011/0081919 A1 | 4/2011 | Das et al. |
| 2011/0105151 A1 | 5/2011 | Hall |
| 2011/0110377 A1 | 5/2011 | Alkhatib et al. |
| 2011/0136468 A1 | 6/2011 | McNamara et al. |
| 2011/0142347 A1 | 6/2011 | Chen et al. |
| 2011/0163874 A1 | 7/2011 | van Os |
| 2011/0208797 A1 | 8/2011 | Kim |
| 2012/0008526 A1 | 1/2012 | Borghei |
| 2012/0046040 A1 | 2/2012 | Chatterjee |
| 2012/0102489 A1 | 4/2012 | Staiman et al. |
| 2012/0116675 A1 | 5/2012 | Iles |
| 2012/0126974 A1 | 5/2012 | Phillips et al. |
| 2012/0166458 A1 | 6/2012 | Laudanski et al. |
| 2012/0172027 A1 | 7/2012 | Partheesh et al. |
| 2012/0237028 A1 | 9/2012 | Khazan et al. |
| 2012/0254045 A1 | 10/2012 | Orfano |
| 2012/0259537 A1 | 10/2012 | Schmidt et al. |
| 2012/0265685 A1 | 10/2012 | Brudnicki et al. |
| 2012/0270563 A1 | 10/2012 | Sayed |
| 2012/0307645 A1 | 12/2012 | Grosman et al. |
| 2013/0091016 A1 | 4/2013 | Shutter |
| 2013/0091452 A1* | 4/2013 | Sorden ................ G06F 30/20 715/771 |
| 2013/0096731 A1 | 4/2013 | Tamari et al. |
| 2013/0097046 A1 | 4/2013 | Krishnamurthy et al. |
| 2013/0103211 A1 | 4/2013 | Peterson et al. |
| 2013/0103307 A1 | 4/2013 | Sartipi et al. |
| 2013/0103543 A1 | 4/2013 | Probst et al. |
| 2013/0117775 A1 | 5/2013 | Perry, II et al. |
| 2013/0212130 A1 | 8/2013 | Rahnama |
| 2013/0225196 A1 | 8/2013 | James et al. |
| 2013/0261874 A1 | 10/2013 | Mcquade et al. |
| 2013/0267196 A1 | 10/2013 | Leemet et al. |
| 2013/0268375 A1 | 10/2013 | Isbister |
| 2013/0295970 A1 | 11/2013 | Sheshadri et al. |
| 2013/0299440 A1 | 11/2013 | Hermann et al. |
| 2013/0300552 A1 | 11/2013 | Chang |
| 2013/0310053 A1 | 11/2013 | Srivastava et al. |
| 2013/0314398 A1 | 11/2013 | Coates et al. |
| 2013/0326137 A1 | 12/2013 | Bilange et al. |
| 2013/0339498 A1 | 12/2013 | Johnson |
| 2014/0006951 A1 | 1/2014 | Hunter |
| 2014/0024395 A1 | 1/2014 | Johnson et al. |
| 2014/0035726 A1 | 2/2014 | Schoner et al. |
| 2014/0043322 A1 | 2/2014 | Fulks et al. |
| 2014/0057648 A1 | 2/2014 | Lyman et al. |
| 2014/0066101 A1 | 3/2014 | Lyman et al. |
| 2014/0081534 A1 | 3/2014 | Maynard et al. |
| 2014/0087780 A1 | 3/2014 | Abhyanker et al. |
| 2014/0094194 A1 | 4/2014 | Schwent et al. |
| 2014/0100900 A1 | 4/2014 | Abhyanker |
| 2014/0101312 A1 | 4/2014 | Huang et al. |
| 2014/0114565 A1 | 4/2014 | Aziz et al. |
| 2014/0123133 A1 | 5/2014 | Luxenberg |
| 2014/0128095 A1 | 5/2014 | Finlow-Bates et al. |
| 2014/0129557 A1 | 5/2014 | Rahnama |
| 2014/0162692 A1 | 6/2014 | Li et al. |
| 2014/0171013 A1 | 6/2014 | Varoglu et al. |
| 2014/0180817 A1 | 6/2014 | Zilkha |
| 2014/0192737 A1 | 7/2014 | Belghoul et al. |
| 2014/0195074 A1 | 7/2014 | Hunt |

(56) References Cited

U.S. PATENT DOCUMENTS

| | | |
|---|---|---|
| 2014/0195664 A1 | 7/2014 | Rahnama |
| 2014/0208397 A1 | 7/2014 | Peterson |
| 2014/0222654 A1 | 8/2014 | Griffin |
| 2014/0248887 A1 | 9/2014 | Alkabra et al. |
| 2014/0270759 A1 | 9/2014 | Djordjevic et al. |
| 2014/0274151 A1 | 9/2014 | Pattabiraman et al. |
| 2014/0282829 A1 | 9/2014 | Dabbiere et al. |
| 2014/0289234 A1 | 9/2014 | Johnson |
| 2014/0295944 A1 | 10/2014 | Faircloth |
| 2014/0309790 A1 | 10/2014 | Ricci |
| 2014/0330456 A1 | 11/2014 | Lopez Morales et al. |
| 2014/0335823 A1 | 11/2014 | Heredia et al. |
| 2014/0339355 A1 | 11/2014 | Olm et al. |
| 2014/0340473 A1 | 11/2014 | Artonne |
| 2014/0371952 A1 | 12/2014 | Ohtomo et al. |
| 2015/0024773 A1 | 1/2015 | Li et al. |
| 2015/0031388 A1 | 1/2015 | Chatterjee et al. |
| 2015/0031398 A1 | 1/2015 | Rahnama |
| 2015/0058233 A1 | 2/2015 | Budlong |
| 2015/0087263 A1 | 3/2015 | Branscomb |
| 2015/0089673 A1 | 3/2015 | Beckman et al. |
| 2015/0095355 A1 | 4/2015 | Patton |
| 2015/0099461 A1 | 4/2015 | Holden et al. |
| 2015/0099537 A1 | 4/2015 | Merithew |
| 2015/0112767 A1 | 4/2015 | Shatzkamer et al. |
| 2015/0112774 A1 | 4/2015 | Georgoff et al. |
| 2015/0120455 A1* | 4/2015 | McDevitt ........... G06Q 30/0261 705/14.58 |
| 2015/0120567 A1 | 4/2015 | Van Rooyen et al. |
| 2015/0134143 A1 | 5/2015 | Willenborg |
| 2015/0141045 A1 | 5/2015 | Qiu et al. |
| 2015/0148060 A1 | 5/2015 | Parab et al. |
| 2015/0149042 A1 | 5/2015 | Cooper et al. |
| 2015/0172862 A1 | 6/2015 | Kau et al. |
| 2015/0185041 A1 | 7/2015 | Holden et al. |
| 2015/0186497 A1 | 7/2015 | Patton et al. |
| 2015/0230053 A1 | 8/2015 | Scellato et al. |
| 2015/0264008 A1 | 9/2015 | Li et al. |
| 2015/0264523 A1 | 9/2015 | Xu et al. |
| 2015/0264554 A1 | 9/2015 | Addepalli et al. |
| 2015/0269438 A1 | 9/2015 | Samarasekera et al. |
| 2015/0281507 A1 | 10/2015 | Konen et al. |
| 2015/0294361 A1 | 10/2015 | Yedidim |
| 2015/0294573 A1 | 10/2015 | Conner et al. |
| 2015/0302456 A1 | 10/2015 | Rego et al. |
| 2015/0303950 A1 | 10/2015 | Shattil |
| 2015/0332325 A1 | 11/2015 | Sharma et al. |
| 2015/0332329 A1 | 11/2015 | Luo et al. |
| 2015/0346722 A1 | 12/2015 | Herz et al. |
| 2015/0348424 A1 | 12/2015 | Duffy et al. |
| 2015/0363603 A1 | 12/2015 | Hsu et al. |
| 2015/0371270 A1 | 12/2015 | McDevitt et al. |
| 2015/0371470 A1 | 12/2015 | Brown et al. |
| 2015/0372972 A1 | 12/2015 | Kennedy |
| 2016/0006628 A1 | 1/2016 | Herring et al. |
| 2016/0006744 A1 | 1/2016 | Du et al. |
| 2016/0007156 A1 | 1/2016 | Chiou et al. |
| 2016/0019592 A1 | 1/2016 | Muttineni et al. |
| 2016/0027055 A1 | 1/2016 | Dixon et al. |
| 2016/0034712 A1 | 2/2016 | Patton et al. |
| 2016/0035054 A1 | 2/2016 | Branscomb et al. |
| 2016/0044472 A1 | 2/2016 | Person |
| 2016/0071420 A1 | 3/2016 | Heilman |
| 2016/0073225 A1 | 3/2016 | Ganesalingam et al. |
| 2016/0080943 A1 | 3/2016 | Ives-Halperin et al. |
| 2016/0097879 A1 | 4/2016 | Stolarczyk et al. |
| 2016/0098723 A1 | 4/2016 | Feeney |
| 2016/0169696 A1 | 6/2016 | Butts, III et al. |
| 2016/0171542 A1 | 6/2016 | Fanous et al. |
| 2016/0183051 A1 | 6/2016 | Nack et al. |
| 2016/0203522 A1 | 7/2016 | Shiffert et al. |
| 2016/0203723 A1 | 7/2016 | Kube |
| 2016/0209219 A1 | 7/2016 | Grush et al. |
| 2016/0267508 A1 | 9/2016 | West |
| 2016/0275801 A1 | 9/2016 | Kopardekar |
| 2016/0277972 A1 | 9/2016 | Ganu et al. |
| 2016/0307447 A1 | 10/2016 | Johnson et al. |
| 2016/0307449 A1 | 10/2016 | Gordon et al. |
| 2016/0323241 A1 | 11/2016 | Jones et al. |
| 2016/0358432 A1 | 12/2016 | Branscomb et al. |
| 2017/0017936 A1 | 1/2017 | Bisikalo et al. |
| 2017/0018184 A1 | 1/2017 | Northrup et al. |
| 2017/0019761 A1 | 1/2017 | Heo |
| 2017/0024412 A1 | 1/2017 | Mollenkopf et al. |
| 2017/0067748 A1 | 3/2017 | Glover et al. |
| 2017/0076522 A1 | 3/2017 | Ives-Halperin et al. |
| 2017/0103659 A1 | 4/2017 | Jin |
| 2017/0116651 A1 | 4/2017 | Greenberger |
| 2017/0118590 A1 | 4/2017 | Baca et al. |
| 2017/0123421 A1 | 5/2017 | Kentley et al. |
| 2017/0150308 A1 | 5/2017 | Jones |
| 2017/0230791 A1 | 8/2017 | Jones |
| 2017/0238129 A1 | 8/2017 | Maier et al. |
| 2017/0249712 A1 | 8/2017 | Branscomb et al. |
| 2017/0286534 A1 | 10/2017 | Arora et al. |
| 2017/0303082 A1 | 10/2017 | Jones |
| 2017/0358212 A1 | 12/2017 | Godwin et al. |
| 2018/0012504 A1 | 1/2018 | van Cruyningen |
| 2018/0061251 A1 | 3/2018 | Venkatraman et al. |
| 2018/0144594 A1 | 5/2018 | Russo |
| 2018/0165970 A1 | 6/2018 | Namgoong et al. |
| 2018/0184243 A1 | 6/2018 | Jones |
| 2018/0191846 A1 | 7/2018 | Jones |
| 2018/0204469 A1 | 7/2018 | Moster et al. |
| 2018/0246983 A1 | 8/2018 | Rathod |
| 2018/0270611 A1 | 9/2018 | Jones |
| 2018/0317043 A1 | 11/2018 | Jones |
| 2018/0322144 A1 | 11/2018 | Jones |
| 2018/0322768 A1 | 11/2018 | Kingsbury et al. |
| 2018/0324546 A1 | 11/2018 | Jones |
| 2019/0009168 A1 | 1/2019 | Aman et al. |
| 2019/0057468 A1 | 2/2019 | Branscomb et al. |
| 2019/0057587 A1 | 2/2019 | Jones et al. |
| 2019/0088106 A1 | 3/2019 | Grundstrom |
| 2019/0129039 A1 | 5/2019 | Schubert et al. |
| 2019/0213699 A1 | 7/2019 | Branscomb et al. |
| 2019/0215298 A1 | 7/2019 | Jones et al. |
| 2019/0223080 A1 | 7/2019 | Wawrowski et al. |
| 2019/0237170 A1 | 8/2019 | Okajima et al. |
| 2019/0253835 A1 | 8/2019 | Jones |
| 2019/0349708 A1 | 11/2019 | Jones |
| 2019/0373405 A1 | 12/2019 | Jones et al. |
| 2019/0387356 A1 | 12/2019 | Branscomb et al. |
| 2020/0034377 A1 | 1/2020 | Jones |
| 2020/0143692 A1 | 5/2020 | Geng et al. |
| 2020/0145415 A1 | 5/2020 | Berdy et al. |
| 2020/0162563 A1 | 5/2020 | Jones |
| 2020/0162842 A1 | 5/2020 | Jones |
| 2020/0196092 A1 | 6/2020 | Jones |
| 2020/0234386 A1 | 7/2020 | Blackman et al. |
| 2020/0294375 A1 | 9/2020 | Branscomb et al. |
| 2020/0296538 A1 | 9/2020 | Jones |
| 2020/0336860 A1 | 10/2020 | Jones |
| 2020/0367029 A1 | 11/2020 | Luo et al. |
| 2020/0380563 A1 | 12/2020 | Shiffert et al. |
| 2020/0394731 A1 | 12/2020 | Branscomb et al. |
| 2020/0403965 A1 | 12/2020 | Jones et al. |
| 2021/0006972 A1 | 1/2021 | Bernat et al. |
| 2021/0042335 A1 | 2/2021 | Jones |
| 2021/0051205 A1 | 2/2021 | Jones |
| 2021/0076155 A1 | 3/2021 | Jones |
| 2021/0090189 A1 | 3/2021 | Blackman et al. |
| 2021/0125163 A1 | 4/2021 | Opoku-Ware et al. |
| 2021/0144511 A1 | 5/2021 | Jones |
| 2021/0219094 A1 | 7/2021 | Jones |
| 2021/0259045 A1 | 8/2021 | Prabhakar et al. |
| 2021/0286888 A1 | 9/2021 | Levin et al. |
| 2021/0341527 A1 | 11/2021 | Blanc-Paques et al. |
| 2021/0357905 A1 | 11/2021 | Branscomb |
| 2021/0365489 A1 | 11/2021 | Sun |
| 2021/0368288 A1 | 11/2021 | Di Corpo |
| 2021/0377739 A1 | 12/2021 | Zein et al. |
| 2022/0019963 A1 | 1/2022 | Whitt |
| 2022/0044533 A1 | 2/2022 | Branscomb et al. |

(56) References Cited

U.S. PATENT DOCUMENTS

| | | |
|---|---|---|
| 2022/0270421 A1 | 8/2022 | Carter |
| 2022/0292253 A1 | 9/2022 | Mehta et al. |
| 2022/0292543 A1 | 9/2022 | Henderson |
| 2023/0073608 A1 | 3/2023 | Awasthy |
| 2023/0090938 A1 | 3/2023 | Jones |
| 2023/0403144 A1 | 12/2023 | Rhodin |
| 2024/0362666 A1 | 10/2024 | Hobbs et al. |
| 2024/0388457 A1 | 11/2024 | Gordon |
| 2024/0403957 A1 | 12/2024 | Boneta |
| 2025/0068666 A1 | 2/2025 | Maheshwari et al. |
| 2025/0078184 A1 | 3/2025 | Fakieh et al. |

FOREIGN PATENT DOCUMENTS

| | | |
|---|---|---|
| JP | 6599321 B2 | 10/2019 |
| KR | 20160018838 A | 2/2016 |
| WO | 2014130090 A1 | 8/2014 |
| WO | 2019241890 A1 | 12/2019 |

OTHER PUBLICATIONS

Robert Barr, What 3 Words, Mar. 2015, v1.1, LYMM, Cheshire, UK.

\* cited by examiner

SYSTEMS, METHODS AND APPARATUS FOR GEOFENCE NETWORKS

CROSS-REFERENCE TO RELATED APPLICATIONS

This application relates to and claims priority from the following U.S. Patent Applications. This application is a continuation of U.S. patent application Ser. No. 18/071,149, filed Nov. 29, 2022, which is a continuation of U.S. patent application Ser. No. 17/219,129, filed Mar. 31, 2021, which is a continuation of U.S. patent application Ser. No. 16/394, 820, filed Apr. 25, 2019, which is a continuation-in-part of U.S. patent application Ser. No. 15/496,602 filed Apr. 25, 2017, which is a continuation-in-part of U.S. patent application Ser. No. 15/213,072 filed Jul. 18, 2016. U.S. patent application Ser. No. 15/213,072 is a continuation-in-part of U.S. patent application Ser. No. 14/745,951, filed Jun. 22, 2015, which is a continuation-in-part of U.S. patent application Ser. No. 14/728,259, filed Jun. 2, 2015, now U.S. Pat. No. 9,363,638, each of which is hereby incorporated by reference in its entirety. U.S. patent application Ser. No. 15/213,072 is also a continuation-in-part of U.S. patent application Ser. No. 14/755,669 filed Jun. 30, 2015, which is a continuation-in-part of U.S. patent application Ser. No. 14/728,259, filed Jun. 2, 2015, now U.S. Pat. No. 9,363,638, and a continuation-in-part of U.S. patent application Ser. No. 14/745,951, filed Jun. 22, 2015, which is a continuation-in-part of U.S. patent application Ser. No. 14/728,259, filed Jun. 2, 2015, now U.S. Pat. No. 9,363,638, each of which is hereby incorporated by reference in its entirety. U.S. patent application Ser. No. 15/213,072 is also a continuation-in-part of U.S. patent application Ser. No. 14/811,234 filed Jul. 28, 2015, which claims priority from U.S. Provisional Application Ser. No. 62/030,252, filed Jul. 29, 2014. U.S. patent application Ser. No. 14/811,234 is also a continuation-in-part of U.S. patent application Ser. No. 14/745,951, filed Jun. 22, 2015, which is a continuation-in-part of U.S. patent application Ser. No. 14/728,259, filed Jun. 2, 2015, now U.S. Pat. No. 9,363,638. U.S. patent application Ser. No. 14/811,234 is also a continuation-in-part of U.S. patent application Ser. No. 14/755,699 filed Jun. 30, 2015, which is a continuation-in-part of U.S. patent application Ser. No. 14/745,951, filed Jun. 22, 2015 and U.S. patent application Ser. No. 14/728,259, filed Jun. 2, 2015, now U.S. Pat. No. 9,363,638. U.S. patent application Ser. No. 14/811,234 is also a continuation-in-part of U.S. patent application Ser. No. 14/740,557 filed Jun. 16, 2015, now U.S. Pat. No. 9,280,559, which is a continuation of U.S. patent application Ser. No. 14/728,259, filed Jun. 2, 2015, now U.S. Pat. No. 9,363,638, each of which is hereby incorporated by reference in its entirety. U.S. patent application Ser. No. 15/213, 072 is also a continuation-in-part of U.S. patent application Ser. No. 14/953,485 filed Nov. 30, 2015, which is a continuation in-part-of U.S. patent application Ser. No. 14/745, 951 filed Jun. 22, 2015, which is a continuation in-part-of U.S. patent application Ser. No. 14/728,259, filed Jun. 2, 2015, now U.S. Pat. No. 9,363,638, each of which is hereby incorporated by reference in its entirety. U.S. patent application Ser. No. 15/213,072 is also a continuation-in-part of U.S. patent application Ser. No. 15/007,661, filed Jan. 27, 2016, now U.S. Pat. No. 9,396,344, which is a continuation of U.S. patent Ser. No. 14/740,557, filed Jun. 16, 2015, now U.S. Pat. No. 9,280,559, which is a continuation of U.S. patent application Ser. No. 14/728,259, filed Jun. 2, 2015, now U.S. Pat. No. 9,363,638, each of which is hereby incorporated by reference in its entirety. Each of the above listed priority documents is incorporated herein by reference in its entirety.

BACKGROUND OF THE INVENTION

1. Field of the Invention

The present invention relates generally to systems and methods for location-based services, especially a space-network model binding Internet Protocol addresses and geographical locations.

2. Description of the Prior Art

Systems, methods, and devices for creating databases of land are well-known in the prior art. It is also known to have an IP address associated with a general location, such as a city or zip code. Furthermore, location-based beacon technologies have entered the mass markets providing geo-location and enabling of portable wireless devices for venue and in-store customer marketing, sales and CRM services. Real estate ownership and the management of business services within the constraints of the business space, like a mall or convention center, has become open game for outside competitive customer poaching and other kinds of interference. Furthermore, geo-fencing could address other contentious applications and their use, such as texting while driving. Ubiquitous smartphone usage and location based mobile marketing and communication have become prevalent in today's society. With 1.75 billion smartphone users in 2014 and 85% of the top 100 retailers estimated to be using beacon technology by 2016, opportunities for determining the interactions of the smartphones, beacons, and the Internet generally within defined spaces are numerous.

Exemplary U.S. Patent documents in the prior art include:

U.S. Pub. No. 2015/0031398 for "Zone-Based Information Linking Systems and Methods" by Rahnama, filed Jul. 29, 2015 and published Jan. 29, 2015, describes a method of linking to a geo-fenced zone, the method comprising: configuring a device to operate as a document processing engine according to zone address identification rules; obtaining, by the document processing engine, a digital document; identifying, by the document processing engine, at least one zone address token in the digital document according to the zone address identification rules; resolving the at least one zone address token to a network address related to a target zone; and enabling the device to link communicatively to the target zone according to the network address.

U.S. Pub. No. 2002/0035432 for "Method and system for spatially indexing land" by Kubica, filed Jun. 8, 2001 and published May 31, 2007, describes a method of spatially indexing land by selecting a parcel (100) of land and extending its boundaries (110) to include a portion of adjacent streets (125) and alleys (122) to define a cell (150). A unique identifier is assigned to the cell as well as a reference point (170) within the cell (150). The reference point has a known location in a global referencing system. An internet address is assigned to the cell which identifies its location, such as the location of the reference point within the cell. This information and other data associated with the cell is then stored in an OX Spatial Index database and includes the street address for the cell and other relevant information such as owner, what type building if any is on the property, location of utility lines, etc. A Spatial Internet Address which includes the geographic location of the cell is assigned for each cell and this information is also stored in the index. The index thereby created can be used for various applications such as determining a user's location and locating geographically relevant information by searching the index and connecting to websites associated with the user's vicinity.

U.S. Pat. No. 6,920,129 for "Geo-spatial internet protocol addressing" by Preston, filed Nov. 30, 2000 and issued Jul. 19, 2005, describes conversion of latitude and longitude to an addressing scheme that supports current TCP/IP (Ipv4) and future addressing (Ipv6/Ipng) requirements. More specifically, it allows a decentralization of the unicast point to a device on the hosted network. Geographical Internet Protocol (geoIP) addressing will facilitate anycast routing schemes in which the nearest node has a statically assigned geoIP. Geo-routing and network management become a function of the geoIP address.

U.S. Pat. No. 8,812,027 for "Geo-fence entry and exit notification system" by Obermeyer, filed Aug. 15, 2012 and issued Aug. 19, 2014, describes a method for determining when a mobile communications device has crossed a geofence. The method comprises (a) providing a mobile communications device (209) equipped with an operating system and having a location detection application resident thereon, wherein the mobile communications device is in communication with a server (211) over a network (203), and wherein the server maintains a geo-fence database (213); (b) receiving, from the operating system, a notification that (i) the location of the mobile communications device has changed by an amount that exceeds a predetermined threshold, or (ii) that a period of time has passed; (c) querying the operating system for a data set comprising the general location of the mobile communications device and the corresponding location accuracy; (d) transmitting the data set to the server; and (e) receiving from the server, in response, a set of geo-fences (205) proximal to the general location.

U.S. Pat. No. 8,837,363 for "Server for updating location beacon database" by Jones, filed Sep. 6, 2011 and issued Sep. 16, 2014, describes a location beacon database and server, method of building location beacon database, and location based service using same. Wi-Fi access points are located in a target geographical area to build a reference database of locations of Wi-Fi access points. At least one vehicle is deployed including at least one scanning device having a GPS device and a Wi-Fi radio device and including a Wi-Fi antenna system. The target area is traversed in a programmatic route to reduce arterial bias. The programmatic route includes substantially all drivable streets in the target geographical area and solves an Eulerian cycle problem of a graph represented by said drivable streets. While traversing the target area, Wi-Fi identity information and GPS location information is detected. The location information is used to reverse triangulate the position of the detected Wi-Fi access point; and the position of the detected access point is recorded in a reference database.

U.S. Pat. No. 8,892,460 for "Cell-allocation in location-selective information provision systems" by Golden, et al., filed Aug. 29, 2014 and issued Nov. 18, 2014, describes system and methods for allocating cells within a virtual grid to content providers according to various priority and selection schemes are used to target content delivery to information playback devices in a geographically and/or application selective manner. The priority schemes, geographical selectivity, and application selectivity of the system and methods of the invention allow a content provider to specifically target a desired demographic with high cost efficiency and flexibility.

U.S. Pub. No. 2014/0171013 for "Monitoring a mobile device en route to destination" by Varoglu, filed Dec. 17, 2012 and published Jun. 19, 2014, describes a system, method and apparatus are disclosed for monitoring a mobile device en route to a destination. A user of a monitored device specifies geo-fence regions along a route to the destination. Entry and exit of regions triggers the sending of event notifications to a monitoring device. Event notifications may be sent if an estimated time of arrival changes due to delay. Event notifications may be sent if the monitored device deviates from a planned route by a threshold distance. Event notifications may be sent through a direct communication link between the monitored device and monitoring device or through a location-based service.

U.S. Pat. No. 8,634,804 for "Devices, systems, and methods for location based billing" by McNamara, filed Dec. 7, 2009, and issued Jan. 21, 2014, describes devices, systems and methods are disclosed which relate to billing users of a telecommunication network. A billing server is in communication with a geo-fence database. The geo-fence database contains a plurality of geo-fences. Some geo-fences are associated with a single mobile communication devices, such as a home geo-fence, work geo-fence, etc., while other geo-fences are global, such as a stadium geo-fence, toll geo-fence, etc. When a mobile communication device enters the perimeter of a geo-fence, a billing server changes the billing rate at which connections are billed to the user account or bills another user account. The mobile communication device may send a ticket code to the billing server for a reduced billing rate while within a geo-fence. If a mobile communication device enters a toll geo-fence, then the billing server charges the user account for the toll.

SUMMARY OF THE INVENTION

The present invention is directed to systems and method and apparatus for location-based services. In one embodiment, a system for location-based services comprises a multiplicity of network devices, a database, and a server platform constructed and configured in network-based communication. The database is configured to store a space-network model binding Internet Protocol (IP) addresses and physical locations. The server platform is operable to define at least one geofence based on the space-network model and specify entitlements for the location-based services within the at least one geofence. The at least one geofence and entitlement for the location-based services are stored to the database. The multiplicity of network devices is configured to learn the space-network model and the at least one geofence and perform tasks based on the entitlements specified for the location-based services within the at least one geofence.

In another embodiment, a system for advertising location information comprises a multiplicity of devices constructed and configured for network-based communication within a geofence. Each of the multiplicity of devices comprises a processor, a transmitter, and a receiver. Each of the multiplicity of devices is configured to emit a unique space-network identifier continuously within the geofence. The unique space-network identifier comprises a binding of an IP address and physical location information for each of the multiplicity of devices. Each of the multiplicity of devices is configured to receive space-network identifiers from its peers within the geofence. Each of the multiplicity of devices is configured to update the unique space-network identifier based on space-network identifiers received from its peers within the geofence.

These and other aspects of the present invention will become apparent to those skilled in the art after a reading of the following description of the preferred embodiment when considered with the drawings, as they support the claimed invention.

DETAILED DESCRIPTION

Priority documents including U.S. Pat. Nos. 9,363,638, 9,280,559, 9,396,344, and copending U.S. patent application Ser. Nos. 14/745,951, 14/755,669, 14/811,234, 14/953,485, 15/213,072 are incorporated herein by reference in their entirety.

Space-Network Model

The present invention provides a space-network model comprised of a combination of an Internet Protocol (IP) network, a directed graph, an optional topological space, and a physical topography and/or elements of a complete geodetic system. A directed graph can be a strip tree, a quadtree, an octree, a b-tree, an r-tree, a weighted graph or a cyclic graph. A topological space can be a manifold (e.g. torus, sphere, Euclidean space), a simplicial complex, or a Hamming space. A complete geodetic system can be the World Geodetic System (WGS84).

The combination of the location and the network is inherent to the space-network model of the present invention. The space-network model is a unique structure built by assigning a unique IP address to a physical location, or from another perspective, the space-network model is given dimension through distribution of IP addresses inside of a mathematical construct. A physical place like a planet can then be placed inside of the space-network model.

In one embodiment of the present invention, the space-network model comprises four elements, including a topographical structure, a directed graph, a reference datum, and an Internet Protocol (IP) network. Preferably, the IP network is IPV6 or IP future versions beyond IPV6. A topographical structure can be constructed from measurements of the surface of a planet, a tectonic plate, a geometric solid. A topological space such as a torus or cylinder can be chosen to accommodate a map projection.

Figure 1:
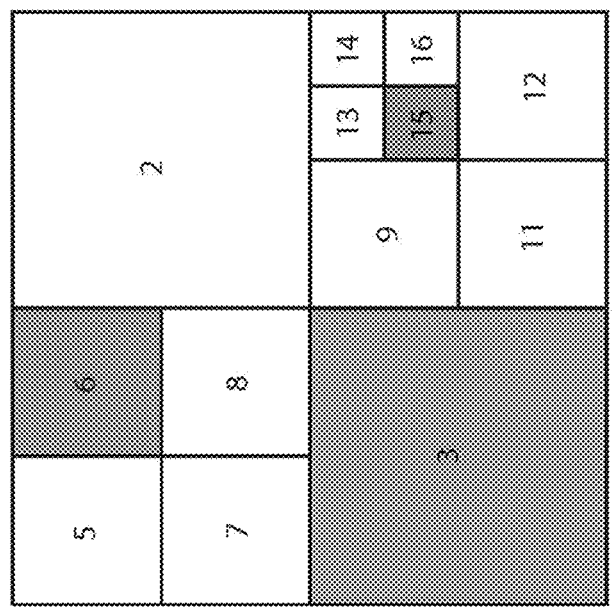
FIG. 1 is a quadtree graph.
Figure 1:
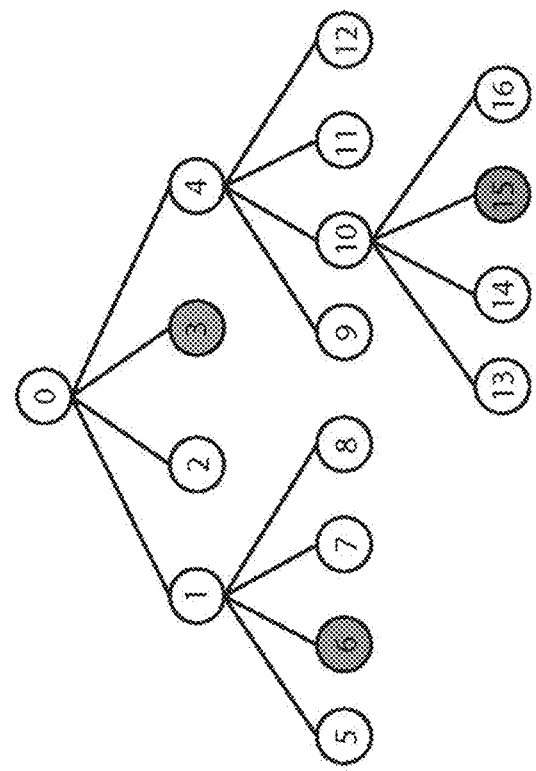
Figure 2:
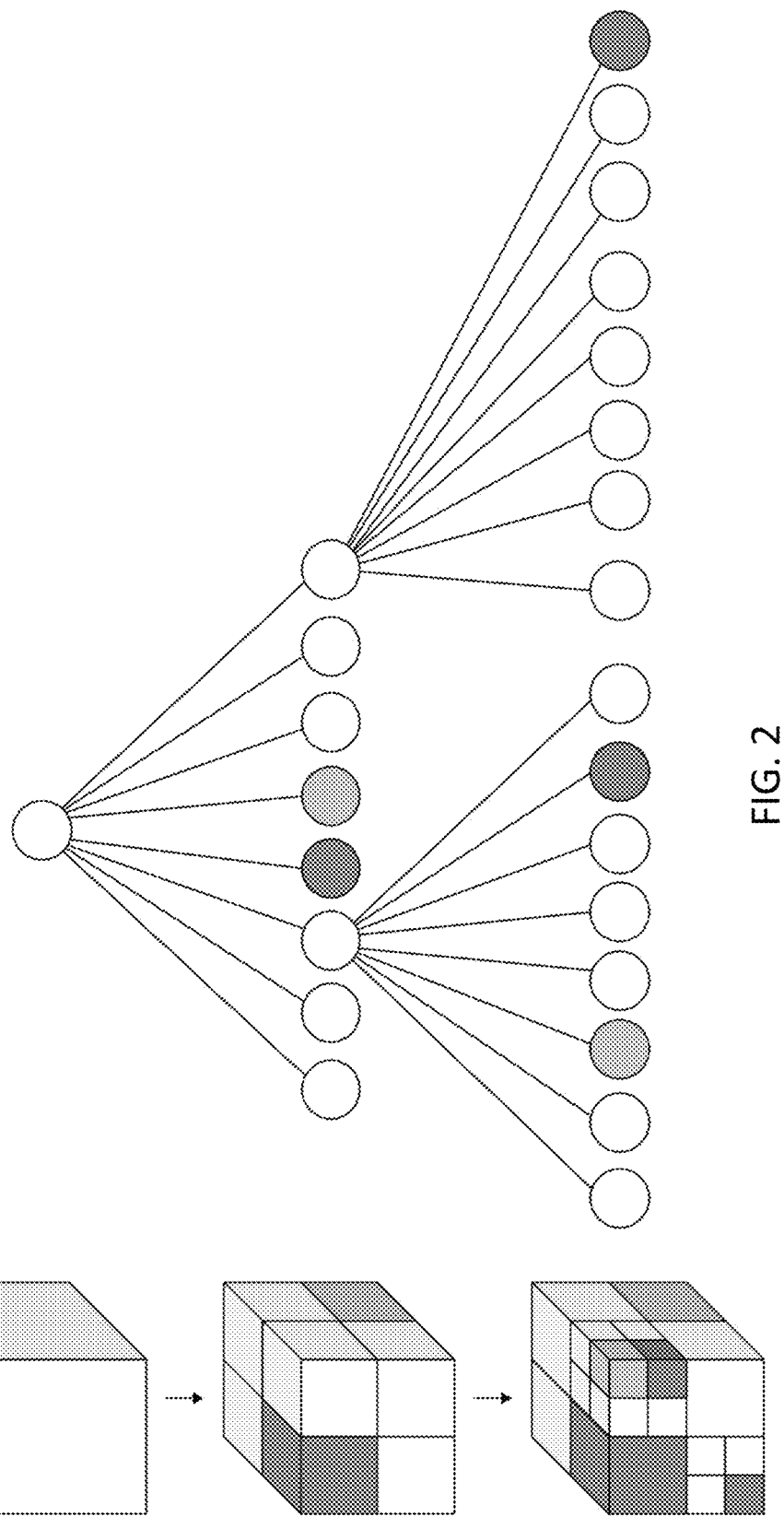
FIG. 2 is an octree graph.

FIG. 1 illustrates a quadtree graph. FIG. 2 illustrates an octree graph. Quadtrees and octrees can be generalized to arbitrary dimensions. A coordinate in N-dimensional Euclidean space always sits in an N-dimensional cube represented by a sequence of digits between 0 and $2^n-1$. An N-dimensional manifold is projected into a lower dimensional Euclidean space. For example, a 3D sphere has a 2D map projection.

A reference datum is selected from a prime beacon, a center of mass, a center of gravity, a center of Global Navigation Satellite System (GNSS) constellation, a fixed point computed by reference to an astronomical object, a natural or manmade satellite, or any other astronomical object, by way of example but not limited to: a star, a comet, an asteroid, and/or a distant pulsar.

A prime beacon is a manmade beacon that transmits its own physical location via information encoded on an energy source. The energy source may be a form of radiant energy (e.g., electromagnetic) or mechanical energy (e.g., sonic). The information is encoded as a space-network identifier. The space-network identifier emitted from the prime beacon is used as the reference datum to establish a space-network frame.

Figure 3:
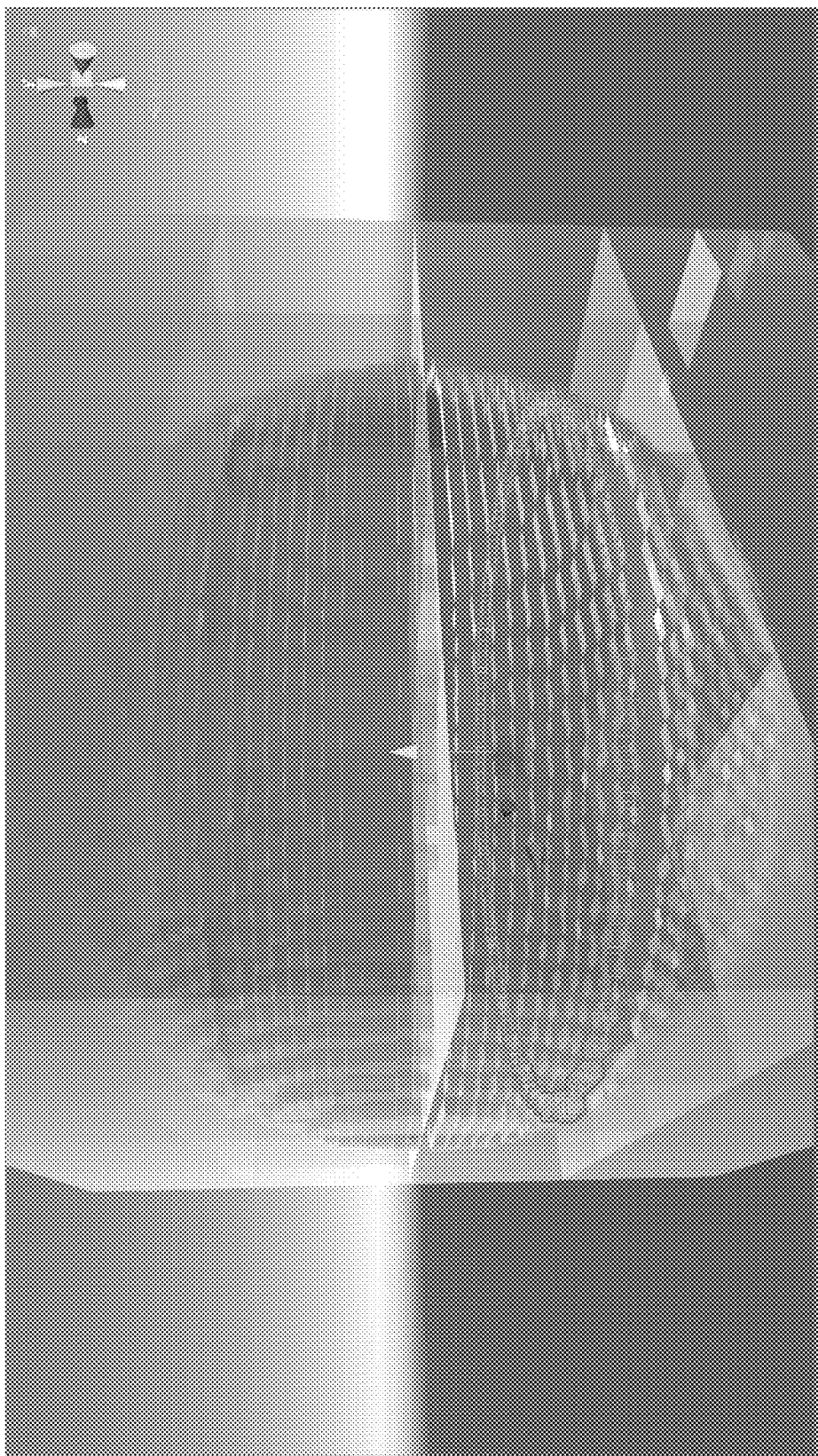
FIG. 3 is visualization in the Unity game engine of a sphere embedded as voxels of a voxelized cube in a Unity world space.

FIG. 3 is a visualization in the Unity game engine of a sphere embedded as voxels of a voxelized cube in a Unity world space. The embedding is obtained by associating a longitude and latitude coordinate to a node in an octree, with that node corresponding to a voxel of the voxelized cube in the Unity world space. The embedding can be augmented by perturbations and distortions so as to provide an embedding of a shape more closely representing that of the Earth; in general, any three-dimensional surface can be embedded similarly in the voxelized cube. A node in the octree, and its corresponding voxel, is represented as an IP network address in a space-network model. The voxel corresponding to each node in the octree can be divided into subcomponents. For example, each face of the voxel can be subdivided into tiles, each tile corresponds to a node in a quadtree, and that node, in turn, is represented as an IP network address in a space-network model.

As will be understood by one of ordinary skill in the art, the Unity world space does not have the same dimensions as the real world since the earth is not a perfect sphere. In other words, the Unity world space is more perfect mathematically. Thus, physics models in the real world are built in the Unity world space for use with the present invention. The illustrated Unity game engine world space provides a coarse representation of a space-network model of the present invention including intersections of datum that gives start in some universe. So, modeling is done in such a world space. A ring illustrated in FIG. 2 is provided to test navigability around a line of latitude for IPV6 aggregation. Each voxel (cube) in FIG. 2 is navigable as an octree and each plane in FIG. 2 is navigable as a quadtree similar to zoom level projections in the present invention.

Reference Frames

Reference frames are independent blocks of a space-network model and are used for any purpose independently of other frames. Reference frames may be provided at any depth of the space-network model. Each reference frame of the present invention has its own multi-dimensional orientation and can be scaled, translated or rotated for any purpose. In one embodiment, a reference frame has an independent reference datum. In another embodiment, a reference frame is anchored to a parent frame.

Figure 4:
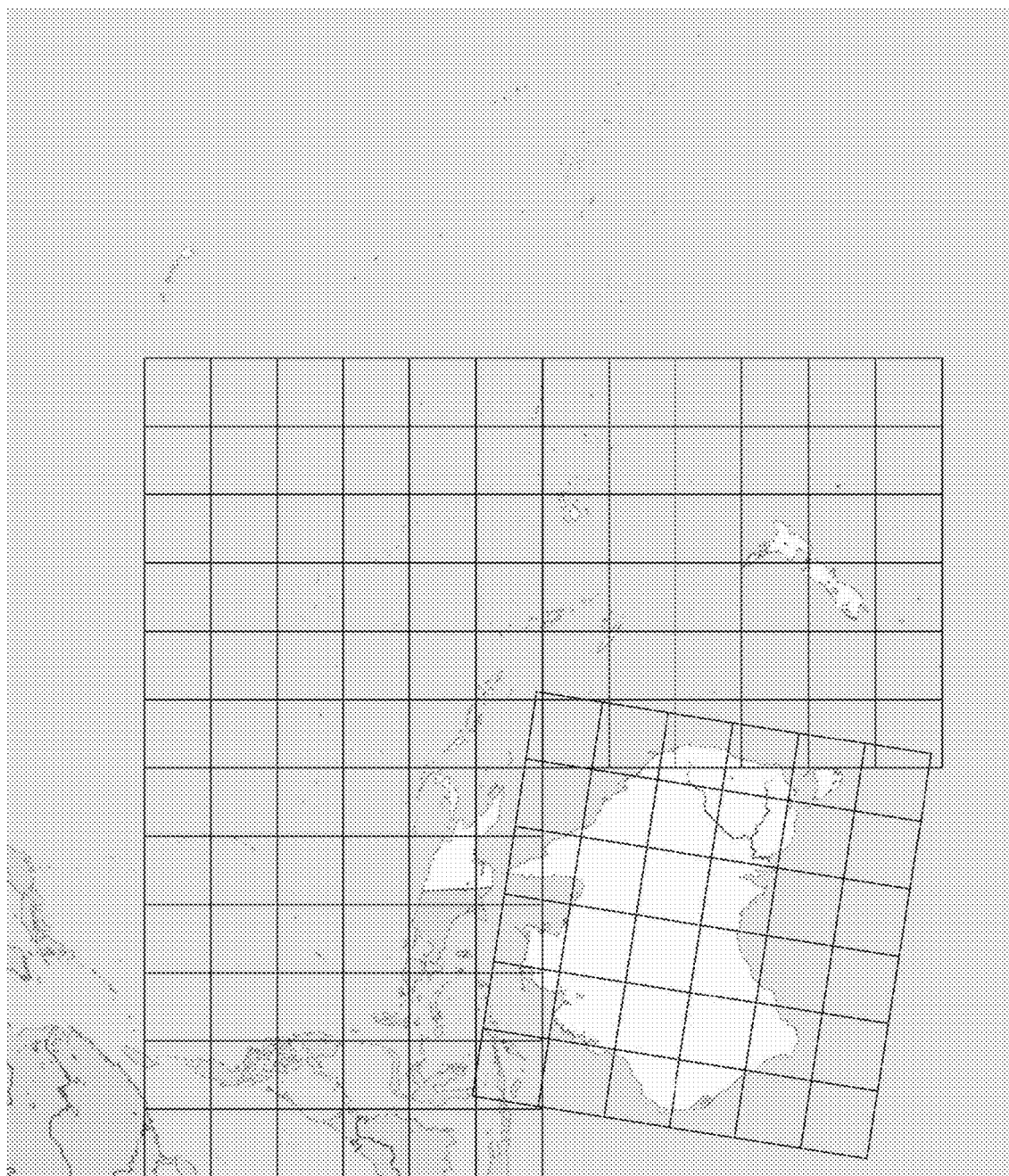
FIG. 4 is an illustration of the space-network model for Australian continent synchronized with the movement of the land mass according to the present invention.

For example, due to tectonic shift, the entire continent of Australia has moved 1.5 meters north over the past 22 years as well as rotated relative to a Geographic Coordinate System (GCS) and surrounding plates. Thus, the space-network model for a local area of Australia is translated and rotated to remain synchronized with the movement of the land mass according to the present invention, as illustrated in FIG. 4.

While the space-network model of the present invention is referred to as reference frames, coordinate systems, map projections and datums that relate to the earth, this space-network relationship is applicable to any dimensional spaces. Dimensional spaces include higher order mathematical structures, geometrical or otherwise.

The earth is not a perfect sphere, it flexes and flows under the influence of tides, gravity and interactions between the earth's mantle and crust. As a coordinate system, the space-network model of the present invention in the context of the geometry of the earth is superior to the GCS in that it allows for localized portions of the space-network model to be decoupled from the whole, thereby allowing parts of the planet to drift, rotate and scale independently within a reference frame. In one embodiment, localized frames of the space-network model are linked to another frame by a pivot point. The pivot point is generally an anchor point at the center of mass or geometric centroid depending on the number of dimensions. In one embodiment, linked frames of the space-network model use dissimilar dimensions, topologies or IP networks, but do not require a datum as they may inherit a datum from a parent frame.

Space-Network Model (SNM)—Based Network Protocol

In the field of computer networking, a network topology describes various arrangements of network nodes (e.g., hosts, routers, switches, and other network connected devices). Network topologies include, for example but not for limitation, busses, rings, stars, and meshes.

For decades, network engineers have been striving to create a mapping of abstract network topologies to the physical world. Many geo-routing and geo-casting protocols have been developed in this pursuit. These protocols vary in methods, but most if not all are prone to gross error through misconfiguration when placed in the hands of network administrators. The geo-casting protocols have failed in the past as they all try to build an ephemeral model that glues geographical topography and network topology together, but the network topology in particular places cannot be verified based on observations and assertions.

The space-network model of the present invention obsoletes these protocols through a simple truth that if a location is known, then the network at that location is known. Conversely, if a network that a distant network node is utilizing or advertising is known, then the exact location for the distant network node is known. This linkage between a network and a location is achieved through the distribution of IP addresses in a topological space. A reference datum is then used to pin the topological space to a topography.

The present invention also provides a network protocol based on the space-network model. The space-network model (SNM)-based network protocol of the present invention represents a fusion of a geographical topography, an IP network and that IP network's topology. It is also operable to leverage and extend beacon-based location services. The SNM-based network protocol of the present invention provides for a fencing agent to derive automatically an exact 3D geographical location using an IPV6 address from the space-network model. Conversely, given a 3D geographical location, the Fencing Agent automatically determines the corresponding IPV6 address using the space-network model.

In one embodiment, the space-network model is applied to the geographic 3D surface of the earth. Every location, for example one room in a building, has a finite number of IP addresses assigned to it in the space-network model of the present invention, thereby automatically creating an IP network (or IP networks) using IPV6 or later version that associates every locational point with its unique IPV6 address. Just as each room of the building is aggregated into a larger structure, in the present invention IP networks corresponding to different locations are aggregated into a supernet, also known as prefix aggregation or route summarization. The aggregation in networking terms is like an address on an envelope. For example, when a zip code is provided, the location area associated with the zip code is known and provides an initial basis for routing the envelope toward a specific address. From that zip code as an initial basis for routing the envelope, adding a street name, and then a house or building number corresponding to a more particular location on the street, the exact location is known or established by the complete address, and the envelope may be delivered accurately to the location corresponding to the complete address.

The present invention includes a mechanism to constantly produce and populate the space-network model database that contains binding between the IP addresses and their corresponding locations, which are inextricably linked together. This mechanism is superior to geocoding or GeoIP data sets which leverage data mining exercises based on zip codes, cities, and/or countries.

Given an IP address, the location information is known based on the space-network model in the present invention. Based on this fundamental truth, the present invention allows for automatically addressing physical space at near real time speeds with a precision of more than 41 trillion IP addresses per atom in the earth, i.e., each IPV6 address corresponds precisely to a 3D location on the earth's surface. Notably, the 3D location can include a dimensional location component above the surface or below the surface of the earth, with a precision of about 10 to 20 addresses along a radius of a proton. The precision provided by the present invention systems and methods using the space-network model (SNM)-based network protocol exceeds what is required in most practical applications for mapping and location-based services. However, the present invention may be further applied to medical imaging or to medical applications to address delivery of medications or treatments at a cellular level, or molecular level, or even more precise.

In one embodiment of the present invention, a device, knowing its location, is operable to make a request via Dynamic Host Configuration Protocol (DHCP), Address Resolution Protocol (ARP), Neighbor Solicitations, Neighbor Advertisements, Router Solicitations, Router Advertisements, or Redirects, for an assignment or assertion of use of an IP address representing its location within a space-network model.

Upon the assignment or acquisition of a new IP network identity, the device is operable to announce the use of this IP address through the course of ARP, directed communication, broadcast, multicast, anycast, or other common uses of IP protocols. Anycast is a network addressing and routing methodology in which datagrams from a single sender are routed to the topologically nearest node in a group of potential receivers, though they may be sent to several nodes, all are identified by the same destination address.

Once becoming aware of the IP addresses currently in use by their network peers, all the other network devices are operable to compute the exact positions of their network peers within the space-network model, thereby knowing the exact 3D positions of their network peers.

Other nearby routers and switches within a physical topography associated with an IP network are operable to check assertions of devices by sending a request that addresses for the devices are indeed within a known or physically possible region. Impossible or unlikely requests could be denied as a security or route optimization measure.

The network protocol provided by the present invention are opportunistic protocols based on zero-configuration networking (zeroconf). Zeroconf is a set of technologies that automatically creates a usable computer network based on the Internet Protocol Suite (TCP/IP) when computers or network peripherals are interconnected. It does not require manual operator intervention or special configuration servers. Apple TV, Chromecast, Airplay are all based on zeroconf.

The SNM-based network protocol provided by present invention provides a back channel between beacon-emitting devices in network connection or routers either having access to GPS or not. The beacon-emitting devices and routers, configured for the SNM-based network protocol, are operable to measure distance between their network peers. The SNM-based network protocol is operable on multiple channels in multiple types of networks including wired and wireless.

In one embodiment of the present invention, some location information encoded in corresponding IP addresses are verified, and some location information are not verified. The present invention enables devices to refine one another's or its own location over time based on emitting-variance-covariance-based estimations or other estimations of precision. The location information is refined automatically and continuously in real time.

Lifecycle for Location Accuracy Augmentation

In one embodiment of the present invention, a first router configured with GPS in a datacenter is operable to initialize a loopback interface with an IPV6 address in which a block of address space is encoded with a physical location of the first router based on the space-network model in the present invention.

The second router in the same datacenter discovers the first router as a network peer over a connected network medium. Upon discovering a space-network identifier and accuracy value from the first router, the second router is operable to use time-distance metrics from its connected interfaces using the built-in cable diagnostics or Time Domain Reflectometry (TDR) to estimate cable lengths and approximate its proximity to the first router.

A third router in the same datacenter discovers its location from a beacon configured for the SNM-based network protocol of the present invention. This third router also joins as a network peer. The second router now has two sources of location and two sources of distance.

Every router is operable to receive information from a new source to further refine its location and in turn provide more accurate augmentation to its peers. If a router does not have any source of location independent of an Ethernet network, for example, a GPS, Wi-Fi receiver, etc, the router is still able to learn the cable lengths between the device and other devices over the Ethernet network.

Beacons Configured for the SNM-Based Network Protocol

According to the present invention, a beacon is configured for the SNM-based network protocol and transmits its own physical location via information encoded on an energy source. The energy source may be a form of radiant energy (e.g., electromagnetic) or mechanical energy (e.g., sonic) based on a radio source, light source, sonic source or ultrasonic source. The information is encoded as a space-network identifier.

Each beacon configured for the SNM-based network protocol is operable to use many sources of location data to establish or refine its own location or its peer's location. These sources include but not limited to other beacons, announcements from network peers, time/distance ranging with other radiant or mechanical energy sources, ground-based or satellite-based location services such as GNSS.

An accuracy value is also encoded with a space-network identifier. The accuracy value represents a beacon's confidence level in the precision of the location that it is advertising within the space-network model. The accuracy value is computed through consideration and comparison of the many sources of location augmentation that the beacon is exposed to.

The only exception is a prime beacon. A prime beacon has a fixed location in a given space-network model and acts as a reference datum for the given space-network frame.

At the time of the present invention, all commercially available radio beacons, for example but not for limitation, iBeacon (Apple), Eddystone (Google), and AltBeacon (Various Vendors), can be configured for the SNM-based network protocol by adding a single chip implementation of the SNM-based protocol provided by the present invention.

Each beacon is operable to advertise its location information by emitting binary space-network identifiers continuously. The location information is encoded in the address portion of a space-network identifier, and an accuracy value is encoded in the metadata portion of the space-network identifier. The space-network identifier is another key similar to a hardware address or a Media Access Control (MAC) address to identify an entity within a space-network model.

In one embodiment, a workflow for installing and initializing one of these commercially available beacons includes the following steps: affix a beacon to a physical place; establish communication between the beacon with a smartphone containing a Fencing Agent enabled application provided by the present invention; the Fencing Agent enabled application configures the beacon based on the location information and a corresponding accuracy value from the Fencing Agent enabled application. The beacon is then operable to continuously transmit a space-network identifier encoded with its location information and an accuracy value.

In one embodiment, a beacon configured for the SNM-based network protocol is placed on an antenna outside a building. The antenna is a survey grade dual antenna for land surveys with sub-centimeter GPS precision. Other beacons inside the building are operable to learn their locations from each other based on triangulation and trilateration.

Routing Engines Configured for the SNM-based Network Protocol

Similar to a beacon configured for the SNM-based network protocol, a routing engine is configurable for the SNM-based network protocol, and is operable to establish and/or refine the location information associated with its IP address from inside the firmware of the routing and switching hardware. If a router with a routing engine configured for the SNM-based network protocol moves, the router is operable to relearn its location by observing the network it is on and/or any network-connected beacon configured for the SNM-based network protocol over zeroconf or other similar discovery mechanism.

Many datacenters have GPS feed at least for accurate clock information and many vendors of routers and switches have the ability to connect to a GPS based source of clock.

A network device such as a router with a routing engine configured for the SNM-based network protocol is operable to take the same GPS feed, derive location information out of standard National Marine Electronics Association (NMEA) messages from the GPS feed, and use link state announcements (LSA) to make authoritative assertions that a network is available in a place, and a place is available in a network. That is, the SNM-based network protocol is a modern internal routing protocol which uses LSA to advertise the availability of a particular IP network on a particular router or switch interface or port. As routers interact with one another through zeroconf or similar advertisements and/or communication with remote peers, they are operable to augment each other's locational precision.

Figure 5:
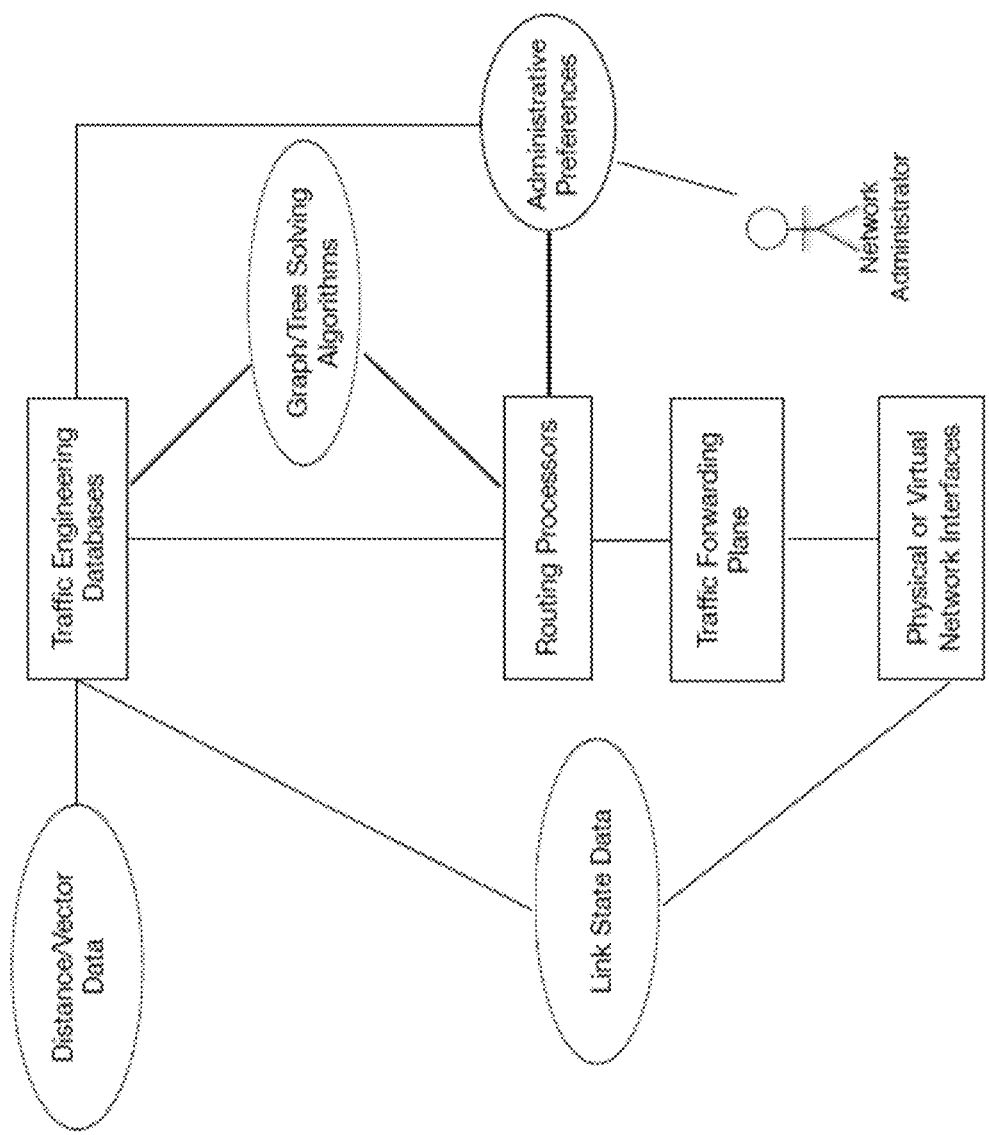
FIG. 5 is a diagram of general routing and switching architecture.

FIG. 5 is a diagram of general routing and switching architecture. Distance/vector data and link state data are collected to traffic engineering databases. The traffic engineering databases communicate with routing processors, both of which are configured with graph or tree solving algorithms. Administrative preferences for the traffic engineering databases and/or the routing processors may be entered by a network administrator. The routing processors are configured with hardware and/or software. A traffic forwarding plane makes decisions on what to do with data arriving in the form of packets, frames or other protocol data units. The data is then transmitted from the traffic forwarding plane to a physical or virtual network interface. When the physical or virtual network interface changes, link state data changes, and traffic engineering database is updated based on the link state data change.

In a space-network model provided by the present invention, a position always references both a physical location and an address block within an IP address. A space-network model provides a mechanism to navigate the IP addresses and the physical world in a consistent manner, and allows for interchanges between directed graphs, projections and physical datums.

Any fragment of a protocol data unit (PDU) at any layer of an Open System Interconnection (OSI) model can be used to reference a position in the space-network model provided by present invention. This includes non-prescribed uses of hardware identifiers such as a MAC address.

Systems configured for the SNM-based network protocol are operable to act as ground-based augmentation (GBA) to GNSS/GPS. Some critical infrastructure is dependent on the precise timekeeping and geolocating of GNSS/GPS, and some critical infrastructure is only dependent on the precise timekeeping of GNSS/GPS. According to the present invention, the systems configured for the SNM-based network protocol are capable of keeping critical infrastructure running in an event of a complete GNSS failure based on location-based aggregation. Some critical infrastructure is only dependent on the precise timekeeping of GNSS.

A blockchain is a distributed transactional ledger. In one embodiment, the blockchain is used as a tamper-proof and corruption-proof record of a geofence ownership, a land deed and/or a smart contract related to the land or geofence. In one embodiment, an IPV6 address in a space-network model is encoded with metadata information, such as a blockchain ID, a transaction ID, and/or a hash in the blockchain for a transaction.

In one embodiment, a web server configured for the SNM-based network protocol in the present invention is operable to learn an exact position of every client by knowing each client's IP address. Thus, the web server log contains the exact position of every client.

In one embodiment, drones are configured according to the present invention to emit space-network identifiers continuously in a form of IP addresses encoded with location information and corresponding accuracy values. When the drones are in a mesh network, they are operable to learn and update each other's position and in real time avoid collision.

In one embodiment, the present invention enables network policies for restricting or allowing network resources based on their exact positions.

In one embodiment, network routing policies are expressed as entitlements on geofences comprised of points within a space-network model, and the behavior of network routing and switching equipment can be further refined by such network routing policies.

The present invention provides systems and methods for advertising location information. A multiplicity of devices is constructed and configured for network-based communication within a geofence. Each of the multiplicity of devices comprises a processor, a transmitter, and a receiver. Each of the multiplicity of devices is configured to emit a unique space-network identifier continuously within the geofence. The unique space-network identifier comprises a binding of an IP address and physical location information for each of the multiplicity of devices. Each of the multiplicity of devices is configured to receive space-network identifiers from its peers within the geofence; and update the unique space-network identifier based on space-network identifiers received from its peers within the geofence. The geofence is defined in a space-network model binding Internet Protocol (IP) addresses and physical locations.

The unique space-network identifier comprises an IP number portion encoded with physical location information for a device emitting the unique space-network identifier. The unique space-network identifier comprises a network portion representing a network that a device emitting the unique space-network identifier is in, and the network portion is encoded with location information for the network that a device emitting the unique space-network identifier is in. The unique space-network identifier comprises a metadata portion encoded with an accuracy value representing a confident level in a precision of the location information for the device emitting the unique space-network identifier. Each of the multiplicity of devices is operable to augment the accuracy value in the unique space-network identifier emitted from each of the multiplicity of devices. The multiplicity of devices is movable, and operable to relearn their location and update the unique space-network identifier based on space-network identifiers received from its peers. The multiplicity of devices is selected from beacons, routers, switches, hosts, and other network connected devices.

Telecom Carrier Infrastructure Management

The present invention is applicable to manage telecom carrier infrastructure. In one embodiment, a geofence in the form of a 2D polygon or 3D volume is defined in a space-network model for an area in a space-network model for certain activities and/or policies in a certain area, such as scheduled installation, maintenance, net neutrality control, traffic policies, etc. In another embodiment, a geofence is drawn around an area that is predicted to be impacted by a storm or other weather event for preemptive traffic restoration, and optimization of customer and public service. In another embodiment, a geofence is defined indicating areas where certain types of service are possible or available.

In these embodiments, specific entitlements are defined for the defined geofence. For example, the entitlements include an intent to route traffic inside the geofence to another part of a stakeholder's own network or a competitor's network outside the geofence; bulk customer migrations of products or pricing plans; telephone number plans; aggregation strategies for IP number space; testing/staging areas for changes of routing/switching configurations; areas not accepting traffic from internal or external peers; and tariff related concerns. The entitlements express routing policies that tune the quality of service (QOS) and/or priority of certain types of traffic inside and/or outside the defined geofence. Note that the entitlements are referred to as requirements and capabilities from the geofence owner and device/application providers' perspectives respectively. Namely, a network carrier expresses requirements for geofence, and a network device/application complies with the requirements by matching their capabilities to the requirements.

Figure 6:
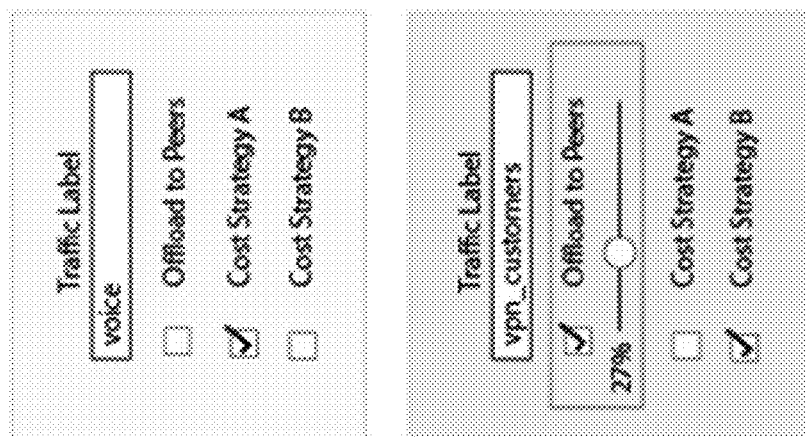
FIG. 6 illustrates a geofence defined for telecom carrier infrastructure in an area.
Figure 6:

FIG. 6 illustrates a geofence is defined for telecom carrier infrastructure in an area. Once a geofence for an area is defined and entitlements are applied within a global or private registry, a network device configured for the SNM-based network protocol is operable to intentionally build a situational understanding of where that area is and how the network device and its peers relate to that area. The network device is operable to comply with the entitlements in order to manipulate its routing and switching behavior. The network device is further operable to update its routes and policies based on updated entitlements of the geofence.

Power System Infrastructure Management

The power grid infrastructure, including power plants, substations, distribution and transmission lines, is surveyed in detail and their locations are exactly known. At least one IPV6 address can be assigned to each equipment and along transmission lines at millimeter level. Each IPV6 address is encoded with the location information in the IP number space and grid topology information (e.g., switches, transformers, capacitors, connections), phase data on the power grid, and other relevant information in the metadata space.

In one embodiment, a geofence is defined for a certain part of a power grid infrastructure, for example, a power plant, a substation or a section of a transmission or distribution line. Specific entitlements are defined for the geofence for different purposes, for example, inspections and maintenance, storm damage assessment, and security.

Figure 7:
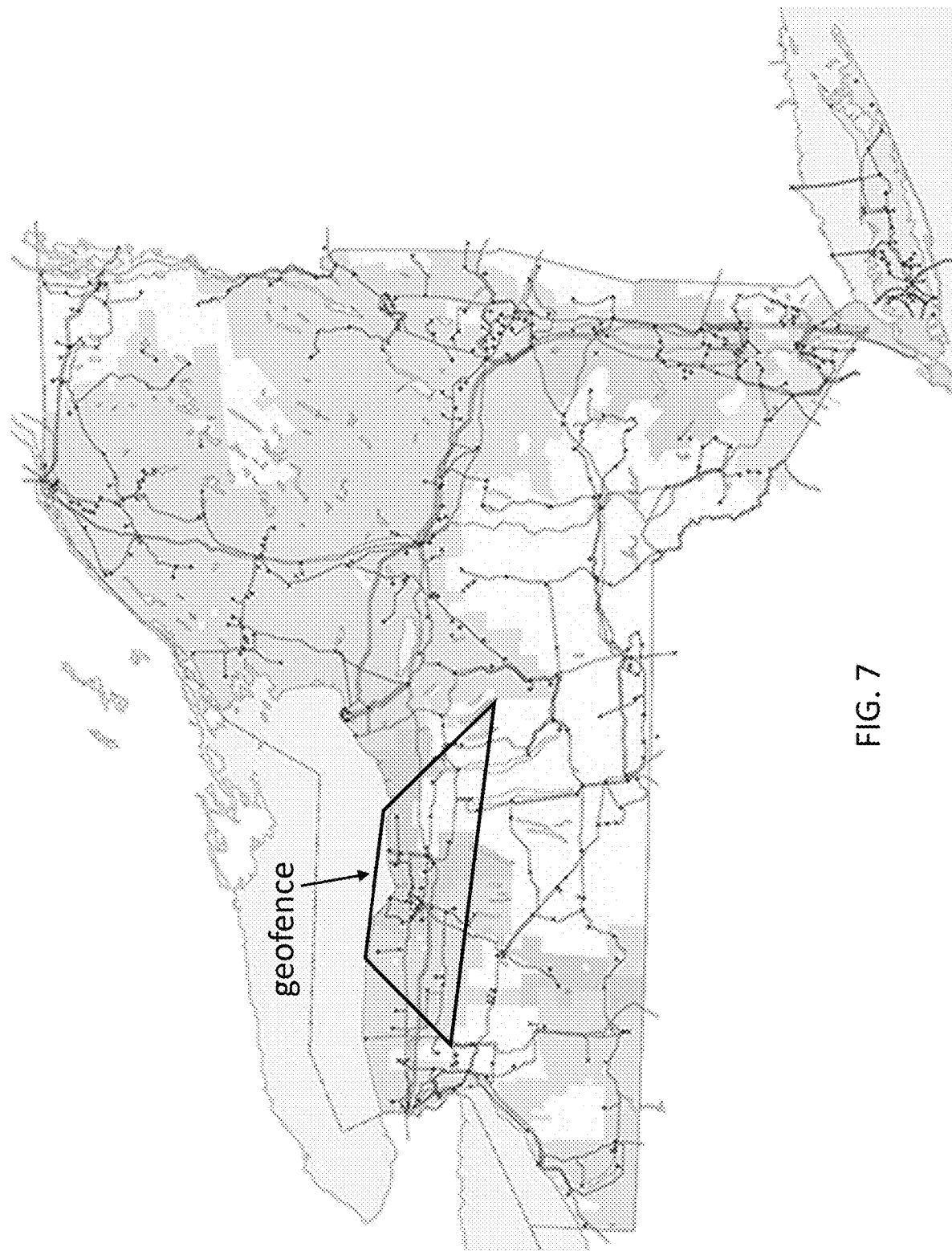
FIG. 7 illustrates a geofence defined in power grid infrastructure for an area.

FIG. 7 illustrates a geofence defined in power grid infrastructure for an area. Once the geofence and specific entitlements are applied within in a global or private registry. A network device configured for the SNM-based network protocol is operable to intentionally build a situational understanding of where that area is and how the network device and its peers relate to that area. The network device is operable to comply with the entitlements in order to manipulate its routing and switching behavior. The network device is further operable to update its routes and policies. The network device is further operable to aggregate IPV6 addresses within the geofence. For example, drones configured for the SNM-based network protocol are operable to detect different parts of the power infrastructure within the geofence; and carry out at least one of the following tasks: inspections, maintenance, storm damage assessment, and security surveillance with more precision and efficiency.

Hospitality Management

The present invention is applicable to property management in hospitality industry. A geofence can be defined in a space-network model for a hotel location and entitlements can be specified for hotel management. In one embodiment, at least one electric LED candle is placed in a hotel room. Each of the at least one electric LED candle is configured for the SNM-based network protocol. Each of the at least one electric LED candle is operable to continuously emit space-network identifiers advertising its address within the geofence in the space-network model. Metadata encoded in a space-network identifier include room number, relative positions within a hotel room, HVAC system within a hotel room, and other electronic switching information.

A network device configured for the SNM-based network protocol is operable to intentionally build a situational understanding of the geofence and related entitlements, and perform certain tasks complying with the entitlements. For example, the network device is operable to receive space-network identifiers, learn the location information and metadata information encoded in the space-network identifiers, for example a room number, temperature information, smoke density, HVAC function information, energy consumption information in a room from which each space-network identifier is emitted. Also as an example, a network device is operable by the hotel management or the HVAC contractors to remotely inspect, control and maintain the HVAC system and other appliance in a specific hotel room.

Vehicular Application: Mobile Space-Network Frames

In a space-network model, a reference frame can be decoupled from a parent frame and subsequently translated, rotated and scaled independently in order to service a mobile space. For example, but not for limitation, the mobile space can be a tectonic plate, a motor vehicle, a flow of vehicles moving on a certain segment of a freeway, etc.

According to the present invention, a reference frame for a moving vehicle is independent and mobile from a global space-network frame. A beacon configured for the SNM-based network protocol is installed in the moving vehicle. In a small area, for example, within a radius of 10 or 30 meters, global uniqueness is not important. In a LAN or PAN network, the odds that an IP number is being reused (i.e., IP collision) is low. This way, the beacon in the moving vehicle can be implemented with a smaller BLE chip, which consumes less power and transmits shorter messages, and the space-network identifiers emitted from the beacon have shorter headers. The space-network identifiers are changeable and unique for different purposes (e.g., marketing campaigns, and traffic reporting). The beacon is operable for broadcast communication and/or directed communication with other vehicles. In one embodiment, the beacon can report impact information based on an accelerometer affixed in the moving vehicle. In one embodiment, the beacon emits software defined PDU over Bluetooth v4.0 Low Energy (BLE).

IPv6 over Low power Wireless Personal Area Networks (6LoWPAN) is a prevailing automotive mesh protocol. In one embodiment, 6LowPAN is used to build regionally unique identifiers in the form of PDUs. 6LoWPAN PDUs have mixed number of bits allowed encoding location information, for example, 16 or 64 bits. The mobile reference frames for different vehicles can be aggregated into large reference frames, and also the network associated with the mobile frames possess aggregation properties, for example, a PAN can be aggregated into a mesh network, which can be aggregated into the global Internet.

In one embodiment, a local reference frame is defined for an area ahead and behind a vehicle within one mile. Sub-micron precision is achieved by creating 64-bit or smaller (with 6LoWPAN header compression) identifiers for each location within the local reference frame. Each identifier for each location is encoded with unique metadata. A prime beacon inside the vehicle acts as an origin for the local reference frame and emits space-network identifiers. In one embodiment, the prime beacon emits 128-bit identifiers.

Figure 8:
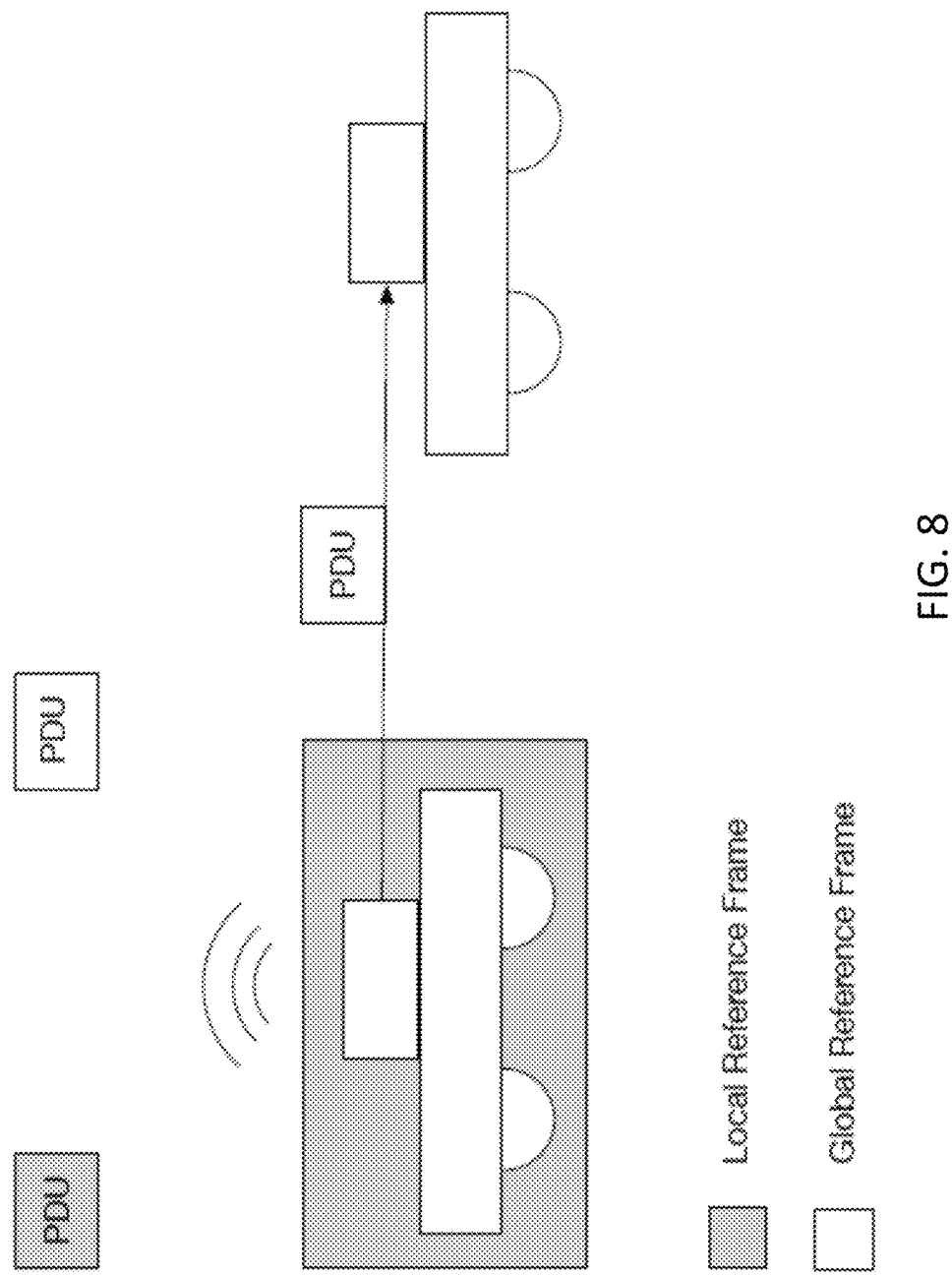
FIG. 8 illustrates a local reference frame built around a vehicle.

FIG. 8 illustrates a local reference frame built around a vehicle. In one embodiment, the prime beacon directs its space-network identifiers in the form of PDUs to surrounding vehicles over 6LoWPAN. In another embodiment, the prime beacon of the local reference frame broadcasts its space-network identifiers in the form of PDUs over 6LoW-PAN. A peer vehicle within the 6LoWPAN listens to the broadcast identifiers, obtains the exact locations of the surrounding vehicles emitting space-network identifiers and other observations from the metadata (e.g., velocity, direction, etc.), decides how close it is to the vehicles emitting identifiers and facilitates decision-making to avoid collision. The local reference frame illustrated in FIG. 8 is preferably designed for autonomous vehicles. In some embodiments, there are radar, sonar, Artificial Intelligence (AI), and/or computer vision technology on board an autonomous vehicle complementary to the local reference frame to detect what an obstacle generally is, for example, debris, drones, animals, etc.

Rule Space

In one embodiment, the present invention provides a global 3D geofence registry based on a proprietary generic top-level domain (gTLD) (e.g., .place), thereby creating a strict binding between the physical world, IP networks, and URL namespace. The global 3D geofences with geospatial boundaries and their rules are published using domain names (e.g., anyname.place) over DNS. In one embodiment, rules can be defined with geofence registration and updated by space owners and regulators based on regulations and preferences through the registry of the present invention, and devices and software applications (Apps) are operable to receive notifications of the rule space related to the registered geofences, implement or follow applicable rules via programed chips, devices, etc. In one embodiment, location-based rules are defined and updatable for devices and software applications by owners and operators of the devices and apps, and the devices and software applications are operable to implement the location-based rules. The present invention is applicable to various industries and applications, including but not limited to aviation (e.g., UAV), transportation (e.g., autonomous vehicles), land registry, logistics, mobile device management, convention centers, maritime, smart cities, resorts, hotels and vacation rentals industry.

In one embodiment, the present invention provides an IPV6 address mapping to a 3D location in a physical space, thereby creating a name-space model or a number-space model. For example, a DNS name for a geofence is 000307aab18d03fe.place.geofrenzy.office, with 000307aab 18d03fe on the left identifying the location, and .place.geofrenzy.office on the right identifying the domain.

In one embodiment, the present invention also provides mapping rules to 3D locations in a physical space, thereby creating a rule-space model. In a rule-space model, every physical location corresponds to an IPv6 address and is encoded in the corresponding IPV6 address. The notion of left and right is also applied to a rule-space model based on common use cases. For example, the interior of a polygon is its right-side rule-space, a point on the boundary of the polygon is right and the ambient space is left. Also for example, the origin point of a polyline is the leftmost point, and the notion of forward and backward on a line become left and right correspondingly. A space filling curve ultimately leads to the origin or end of the IPV6 number-space by going left or right. In one embodiment, the left side of all the topologies in the present invention represents a large physical area or volume, which applies to graph navigation.

Figure 9A:
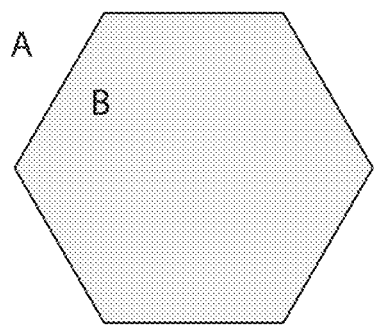
FIGS. 9A-9E illustrate the notion of left and right for a rule space according to one embodiment of the present invention.
Figure 9B:
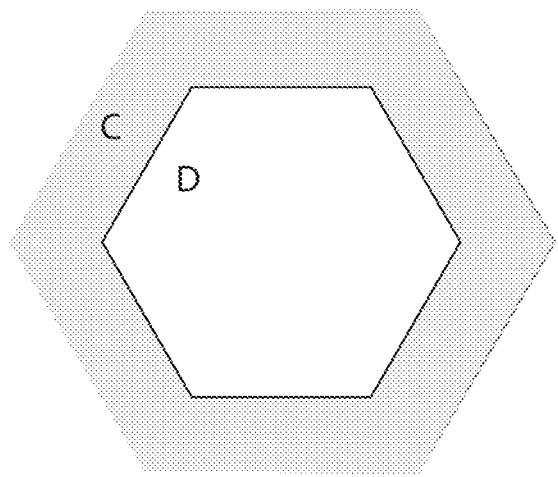
Figure 9C:
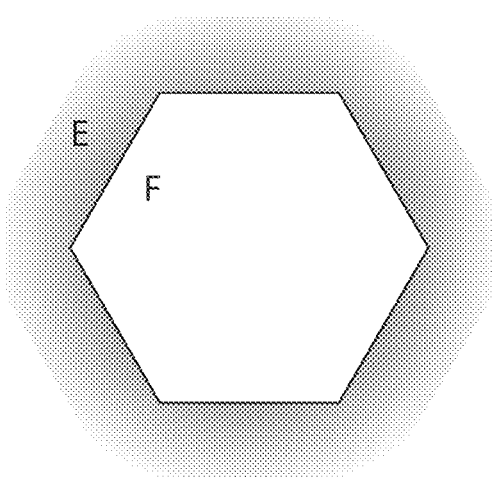
Figure 9D:
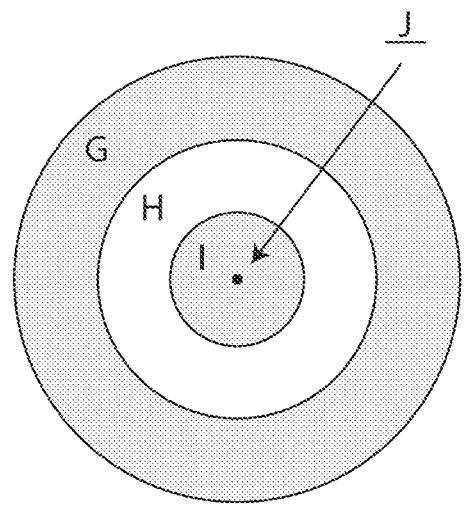
Figure 9E:
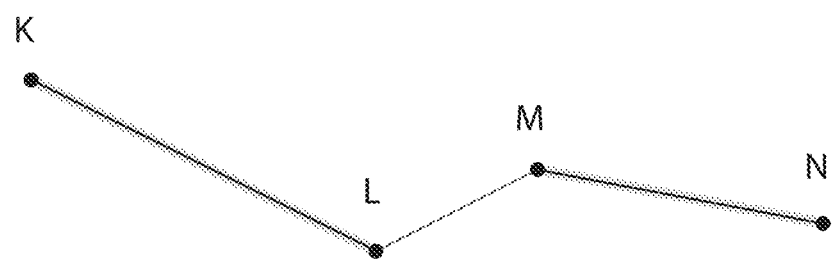

FIGS. 9A-9E illustrate the notion of left and right for a rule space according to one embodiment of the present invention. In FIG. 9A, empty rule space A is on the left side of rule space B. In FIG. 9B, bounded rule space C is on left side of empty rule space D. In FIG. 9C, ambient rule space E is on the left side of empty rule space F. In FIG. 9D, empty rule space H is on the right side of rule space G and on the left side of rule space I, and rule space J is on the right side of rule space I. In FIG. 9E, origin point K is part of rule space K-L, which is on the left side of empty rule space L-M. Rule space M-N contains end point N, and is on the right side of empty rule space L-M.

Figure 10A:
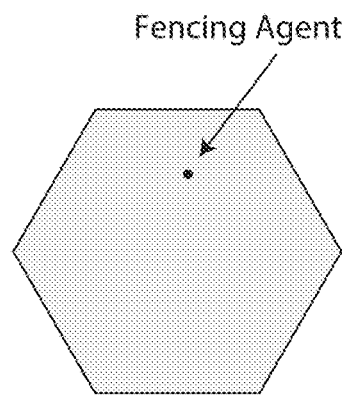
FIGS. 10A-10E illustrate the rule space elasticity according to one embodiment of the present invention.
Figure 10B:
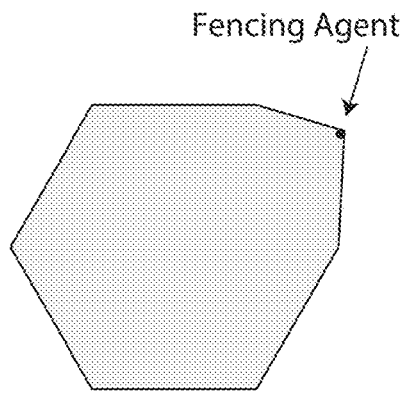
Figure 10C:
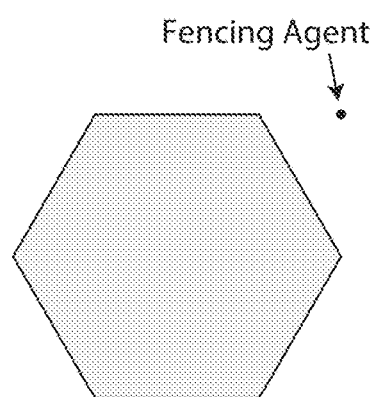
Figure 10D:
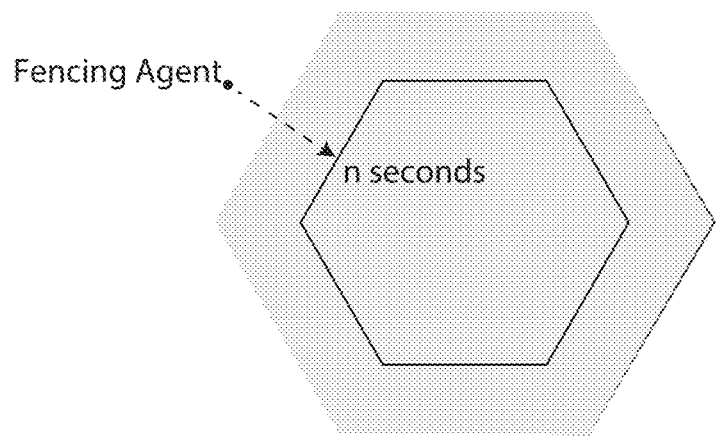
Figure 10E:
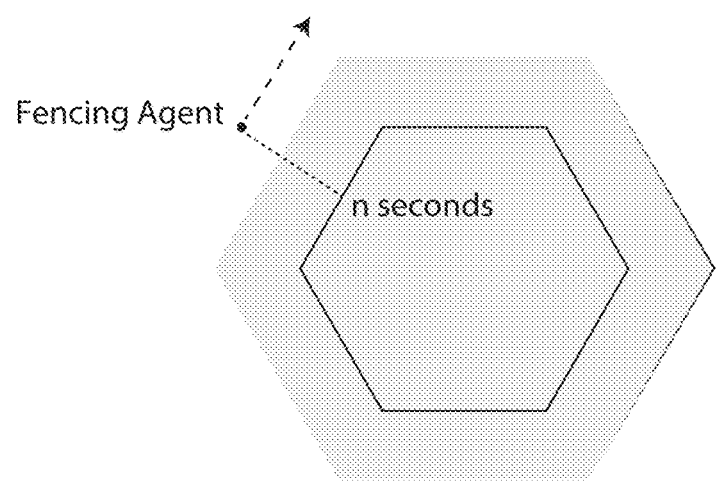

In one embodiment, a rule space is elastic. A rule space guard for a rule space, as a breach monitor, monitors objects installed with fencing agents approaching the rule space and automatically updates the boundary of the rule space to provide "grace time" and "grace space" for compliance. FIGS. 10A-10C illustrate a fencing agent from inside to outside of a bounded rule space. The fencing agent is inside the bounded rule space in FIG. 10A. The boundary of the bounded rule space expands as it moves toward the boundary of the bounded rule space. FIG. 10B illustrates the boundary of the bounded rule space is updated and the fencing agent is on the updated boundary of the bounded rule space. That is, the rules of the rule space still apply to the fencing agent. FIG. 10C shows the boundary of the bounded rule space is back to the original shape (the same shape as in FIG. 10A) when the fencing agent is outside the bounded rule space. Alternatively, when a fencing agent moves from outside to inside of a bound rule space, the boundary of the bounded of the bounded rule space expands similarly. FIG. 10D illustrates that a fencing agent outside a bounded rule space is approaching the bounded rule space. The approach invokes the bounded rule space expansion based on predicted breaches of rules in the bounded rule space in a predicted period of time. FIG. 10E illustrates the course of a moving fencing agent outside a bounded rule space abruptly changes, which invokes the expansion of the bounded rule space based on technical rule breaches in the bounded rule space due to the abrupt course change. In one embodiment, the abrupt course change is an inflection of course. In one embodiment, the abrupt course change is a path inflation, such as getting outside of the rule space and quickly getting back inside of the rule space in a predetermined period of time. For example, but not for limitation, a boat equipped with a fencing agent is traveling in crosscurrents and goes off of its predetermined navigation rule space. The rule space guard is operable to apply an expansion to the navigation rule space to allow time and space for reposition and adjustment. Also, for example, a drone deviates from its predetermined route rule space in crosswinds, and the rule space guard is operable to expand the route rule space by a predetermined deviation for a predetermined period of time for compliance. Also, for example, an autonomous vehicle swerves for collision avoidance and gets outside of a predetermined speed rule space on the road. The speed rule space is operable to expand for the autonomous vehicle for speed compliance.

Figure 11:
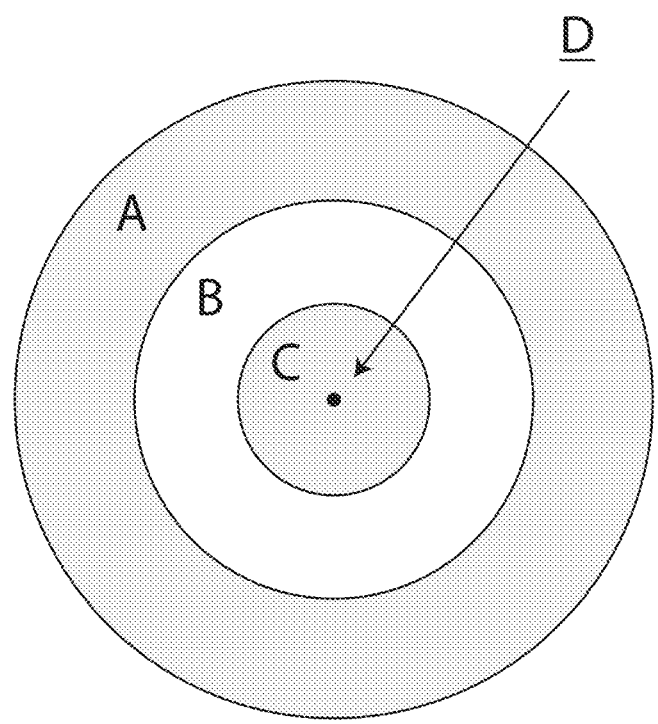
FIG. 11 illustrates different rule space zones according to one embodiment of the present invention.

In one embodiment, a rule space is visualized with augmented reality (AR). For example, ARKit, Apple's AR development platform for iOS mobile devices, is operable to build high-detail AR visualization by integrating the phone camera and motion tracking features. Rule spaces with AR visualization can be implemented in convention centers, for example for different exhibit areas, booths, specific demo spots, etc. In one embodiment, AR visualization is used for point cloud detection. Thus, the present invention provides for creation of an indoor boundary using a local point cloud reference. In one embodiment, instead of GPS geodetic coordinates, ARKit uses beacon(s) such as iBeacon and camera(s) to identify a visual representation of a place in a point cloud reference. FIG. 11 illustrates different rule space zones according to one embodiment of the present invention. In one embodiment, a rule space is a point. In FIG. 11, rule space D is a point rule space. Referencing point rule space D, rule space C is an immediate circle area, rule space B is the near circle area, and rule space A is the far circle area. These rule spaces overlap and create different zones visualized with AR. Rules in different rule spaces are implemented with iBeacon, Near Field Communications (NFC), QR-Code, and other relevant technologies. In one embodiment, ARKit is operable to track real-world positions and orientations of objects in the rule spaces, track positions and orientations of images captured in the rule spaces with AR visualization, and search real-world objects in the images captured in the rule spaces with AR visualization.

In one embodiment, the present invention provides systems and methods for enforcing at least one rule associated with a geofence. A server platform and a database are in network communication with at least one device. The server platform is operable to define at least one geofence for a region of interest and specify at least one rule associated with the at least one geofence, thereby creating a rule-space model for the region of interest. The at least one geofence comprises a multiplicity of geographic designators with each geographic designator assigned a unique IPV6 address. The database is operable to store the rule-space model including the at least one geofence and the at least one rule. A fencing agent is installed on the at least one device. The fencing agent is operable to receive at least one notification signal regarding the at least one rule associated with the rule-space model from the server platform when the at least one device is within a predetermined distance of the region of interest. The fencing agent is operable to cause the at least one device to implement the at least one rule associated with the at least one geofence.

In one embodiment, the distance of the at least one device to the at least one geofence is determined by the nearest point on the perimeter of the at least one geofence to the at least one device. In one embodiment, the distance of the at least one device to the at least one geofence is determined by the center point of the at least one geofence to the at least one device.

In one embodiment, the at least one rule comprises prohibition of a physical presence of an unmanned aerial vehicle in the region of interest. In one embodiment, the server platform and/or the fencing agent is operable to cause an unmanned aerial vehicle to automatically land or idle outside the at least one geofence or travel to a predetermined location upon arriving at the boundary of the at least one geofence. The predetermined location is a home location or original location in one embodiment. The predetermined location is another geofence or delivery point in another embodiment, such as a geofence or a delivery point associated with a delivery route. Alternatively, the unmanned aerial vehicle is operable to send a message to a device associated with the at least one geofence or to a controller of the unmanned aerial vehicle upon idling or landing outside the at least one geofence. The message requests instructions or permission for the unmanned aerial vehicle to enter the geofence or perform an action proximal to the geofence. In one embodiment, the at least one rule comprises no texting in the region of interest. The server platform and/or the fencing agent is operable to cause a mobile device to automatically disable sending and receiving text messages when the mobile device is within the region of interest. In one embodiment, the at least one rule comprises a speed limit for the region of interest. The server platform and/or the fencing agent is operable to cause an autonomous vehicle to automatically adjust a speed of the autonomous vehicle to the speed limit for the region of interest. The speed of the autonomous vehicle is adjusted downward in one embodiment and is adjusted upward in another embodiment.

Certain modifications and improvements will occur to those skilled in the art upon a reading of the foregoing description. In an alternate embodiment of the systems and methods of the present invention, LatLong is used and forward records instead of using IP addresses as described in the foregoing preferred embodiments. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A system for enforcing at least one rule associated with a geofence, comprising:
a platform configured for network communication with at least one device;
wherein the platform includes a rule-space model for at least one geofence;
wherein the at least one geofence comprises a multiplicity of designators with each designator assigned an IP address;
wherein the platform is operable to cause the at least one device to implement at least one rule;
wherein a distance of the at least one device to the at least one geofence may be determined by a nearest point on the perimeter of the at least one geofence to the at least one device, wherein a distance of the at least one device to the at least one geofence may be determined by a center point of the at least one geofence to the at least one device;
wherein the at least one device includes an autonomous vehicle, and wherein the at least one rule causes the autonomous vehicle to remain outside the at least one geofence or travel to a predetermined location; and
wherein the at least one rule determines a physical space the autonomous vehicle is permitted to occupy.

2. The system of claim 1, wherein the at least one rule prohibits a physical presence of the at least one device in a region of interest.

3. The system of claim 1, wherein the at least one rule causes the at least one device to send a message to a device associated with the at least one geofence upon the at least one device approaching the at least one geofence.

4. The system of claim 1, wherein the at least one rule disables the at least one device from sending text messages when the at least one device is in a region of interest.

5. The system of claim 1, wherein the at least one rule disables the at least one device from receiving text messages when the at least one device is in a region of interest.

6. The system of claim 1, wherein a topological space of the rule-space model is pinned to a physical topography.

7. The system of claim 1, wherein the platform is operable to transmit at least one notification signal regarding the at least one rule associated with the rule-space model when the at least one device is within a predetermined distance of the at least one geofence.

8. The system of claim 1, wherein the at least one rule comprises a speed limit for a region of interest.

9. The system of claim 8, wherein the platform is operable to cause an autonomous vehicle to automatically adjust a speed of the autonomous vehicle to the speed limit for a region of interest, wherein the speed of the autonomous vehicle is adjusted downward and/or upward.

* * * * *